«12» United States Patent
Cha et al.

«10» Patent No.: US 12,353,247 B2
«45» Date of Patent: Jul. 8, 2025

«54» ELECTRONIC DEVICE INCLUDING PREVIEW OF FLEXIBLE DISPLAY EXTENSION AND METHOD OF CONTROLLING THE SAME

«71» Applicant: Samsung Electronics Co., Ltd., Gyeonggi-do (KR)

«72» Inventors: Dohun Cha, Gyeonggi-do (KR); Myunghoon Kwak, Gyeonggi-do (KR); Minsoo Kim, Gyeonggi-do (KR); Youngseong Kim, Gyeonggi-do (KR); Wonkyu Sung, Gyeonggi-do (KR); Yangwook Kim, Gyeonggi-do (KR); Jihea Park, Gyeonggi-do (KR)

«73» Assignee: Samsung Electronics Co., Ltd, Suwon-si (KR)

«*» Notice: Subject to any disclaimer, the term of this patent is extended or adjusted under 35 U.S.C. 154(b) by 168 days.

«21» Appl. No.: 17/837,464

«22» Filed: Jun. 10, 2022

«65» Prior Publication Data

US 2022/0397939 A1    Dec. 15, 2022

Related U.S. Application Data

«63» Continuation of application No. PCT/KR2022/008165, filed on Jun. 9, 2022.

«30» Foreign Application Priority Data

Jun. 10, 2021   (KR) ................ 10-2021-0075535
Sep. 27, 2021   (KR) ................ 10-2021-0126952

«51» Int. Cl.
*G06F 1/16*       (2006.01)
*G06F 3/04842*    (2022.01)
*G06F 3/04845*    (2022.01)

«52» U.S. Cl.
CPC ........ *G06F 1/1652* (2013.01); *G06F 3/04842* (2013.01); *G06F 3/04845* (2013.01)

«58» Field of Classification Search
None
See application file for complete search history.

«56» References Cited

U.S. PATENT DOCUMENTS

2004/0036432 A1   2/2004   Yoo
2007/0096679 A1   5/2007   Kim et al.
(Continued)

FOREIGN PATENT DOCUMENTS

EP   3825811 A1   5/2021
EP   4053672 A1   9/2022
(Continued)

OTHER PUBLICATIONS

International Search Report dated Sep. 7, 2022.
Extended European Search Report dated Jul. 18, 2024.

*Primary Examiner* — Haimei Jiang
«74» *Attorney, Agent, or Firm* — Cha & Reiter, LLC

«57» ABSTRACT

An electronic device for providing user experience based on a display extension profile and a method of controlling the same are disclosed. An electronic device according to an embodiment may include a housing, a flexible display disposed inside the housing, at least one driving motor disposed inside the housing and configured to extend a part of the flexible display from the housing, a memory storing a display extension profile related to control of the driving motor, and at least one processor. The at least one processor may be configured to identify occurrence of an event related to display of a preview screen showing a process of drawing out the flexible display, and display the preview screen showing the process of drawing out the flexible display through the flexible display, based on the display extension (Continued)

profile stored in the memory in response to the identification of the occurrence of the event.

20 Claims, 20 Drawing Sheets

(56) References Cited

U.S. PATENT DOCUMENTS

| | | | |
|---|---|---|---|
| 2009/0048000 A1 | 2/2009 | Ade-Hall | |
| 2009/0051830 A1* | 2/2009 | Matsushita | G06F 3/1423 361/679.05 |
| 2010/0283713 A1 | 11/2010 | Fein et al. | |
| 2011/0312387 A1* | 12/2011 | Heo | G06F 3/0482 455/566 |
| 2014/0204037 A1* | 7/2014 | Kim | G06F 3/03 345/173 |
| 2014/0245223 A1 | 8/2014 | Park et al. | |
| 2016/0085319 A1* | 3/2016 | Kim | H04M 1/0268 345/156 |
| 2016/0147262 A1* | 5/2016 | Lee | G06F 3/016 345/173 |
| 2016/0307545 A1* | 10/2016 | Lee | G09G 5/346 |
| 2019/0197960 A1* | 6/2019 | Kim | G09G 3/035 |
| 2020/0114763 A1 | 4/2020 | Eom et al. | |
| 2022/0121240 A1 | 4/2022 | Jang et al. | |

FOREIGN PATENT DOCUMENTS

| | | |
|---|---|---|
| JP | WO2007/077649 A1 | 7/2007 |
| JP | 2012-527012 A | 11/2012 |
| KR | 10-2004-0017954 A | 3/2004 |
| KR | 10-2007-0048065 A | 5/2007 |
| KR | 10-2012-0003537 A | 1/2012 |
| KR | 10-2014-0095347 A | 8/2014 |
| KR | 10-2015-0008982 A | 1/2015 |
| KR | 10-2016-0123201 A | 10/2016 |
| KR | 10-2017-0062121 A | 6/2017 |
| KR | 10-2019-0079241 A | 7/2019 |
| KR | 10-2047690 B1 | 11/2019 |
| KR | 10-2086507 B1 | 3/2020 |
| KR | 10-2020-0042660 A | 4/2020 |
| KR | 10-2021-0007773 A | 1/2021 |
| WO | 2021/085658 A1 | 5/2021 |

* cited by examiner

ELECTRONIC DEVICE INCLUDING PREVIEW OF FLEXIBLE DISPLAY EXTENSION AND METHOD OF CONTROLLING THE SAME

CROSS-REFERENCE TO RELATED APPLICATION(S)

This application is a continuation application based on and claims priority under 35 U.S.C. § 120 to PCT International Application No. PCT/KR2022/008165, which was filed on Jun. 9, 2022, and claims priority to Korean Patent Application Nos. 10-2021-0075535, filed on Jun. 10, 2021, and 10-2021-0126952, filed on Sep. 27, 2021, in the Korean Intellectual Property Office, the disclosure of which are incorporated by reference herein their entirety.

BACKGROUND

Technical Field

One or more embodiments of the instant disclosure generally relate to an electronic device including a flexible display and a method of controlling the same.

Background Art

A large number of services and functions are increasingly provided through an electronic device, for example, a portable electronic device such as a smartphone. To increase the utility of electronic devices and satisfy the demands of users, communication service providers or electronic device manufacturers are competitively developing electronic devices to provide various functions and differentiate themselves from each other. Accordingly, the electronic devices are being advanced.

SUMMARY

An electronic device having a flexible display has been introduced to the marketplace. However, conventionally these devices cannot provide various user experiences based on a speed at which the exposed area of the flexible display is changed.

An electronic device according to an embodiment of the disclosure may include a housing, a flexible display at least partially disposed inside the housing, at least one driving motor disposed inside the housing and configured to extend a part of the flexible display from the housing, a memory storing at least one display extension profile related to control of the driving motor, and at least one processor. The at least one processor may be configured to identify occurrence of an event related to display of a preview screen showing a process of drawing out the flexible display, and display the preview screen showing the process of drawing out the flexible display through the flexible display, based on the at least one display extension profile stored in the memory in response to the identification of the occurrence of the event.

A method of controlling an electronic device according to an embodiment of the disclosure may include identifying occurrence of an event related to display of a preview screen showing a process of drawing out a flexible display of the electronic device, and displaying the preview screen showing the process of drawing out the flexible display through the flexible display, based on at least one display extension profile stored in a memory of the electronic device in response to the identification of the occurrence of the event.

An electronic device according to an embodiment of the disclosure may include a housing, a flexible display at least partially disposed inside the housing, at least one driving motor disposed inside the housing and configured to extend a part of the flexible display from the housing, and at least one processor. The at least one processor may be configured to display a user interface screen for setting a length of at least one extension section of the flexible display and at least one extension section speed corresponding to the at least one extension section, on the flexible display, receive at least one first value for setting the length of the at least one extension section and at least one second value for setting the at least one extension section speed from a user through the flexible display, and display a preview screen showing a process of extending the flexible display based the at least one first value and the at least one second value on the user interface screen.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

According to certain embodiments of the disclosure, various user experiences may be provided based on the speed at which a flexible display is extended.

Figure 1:
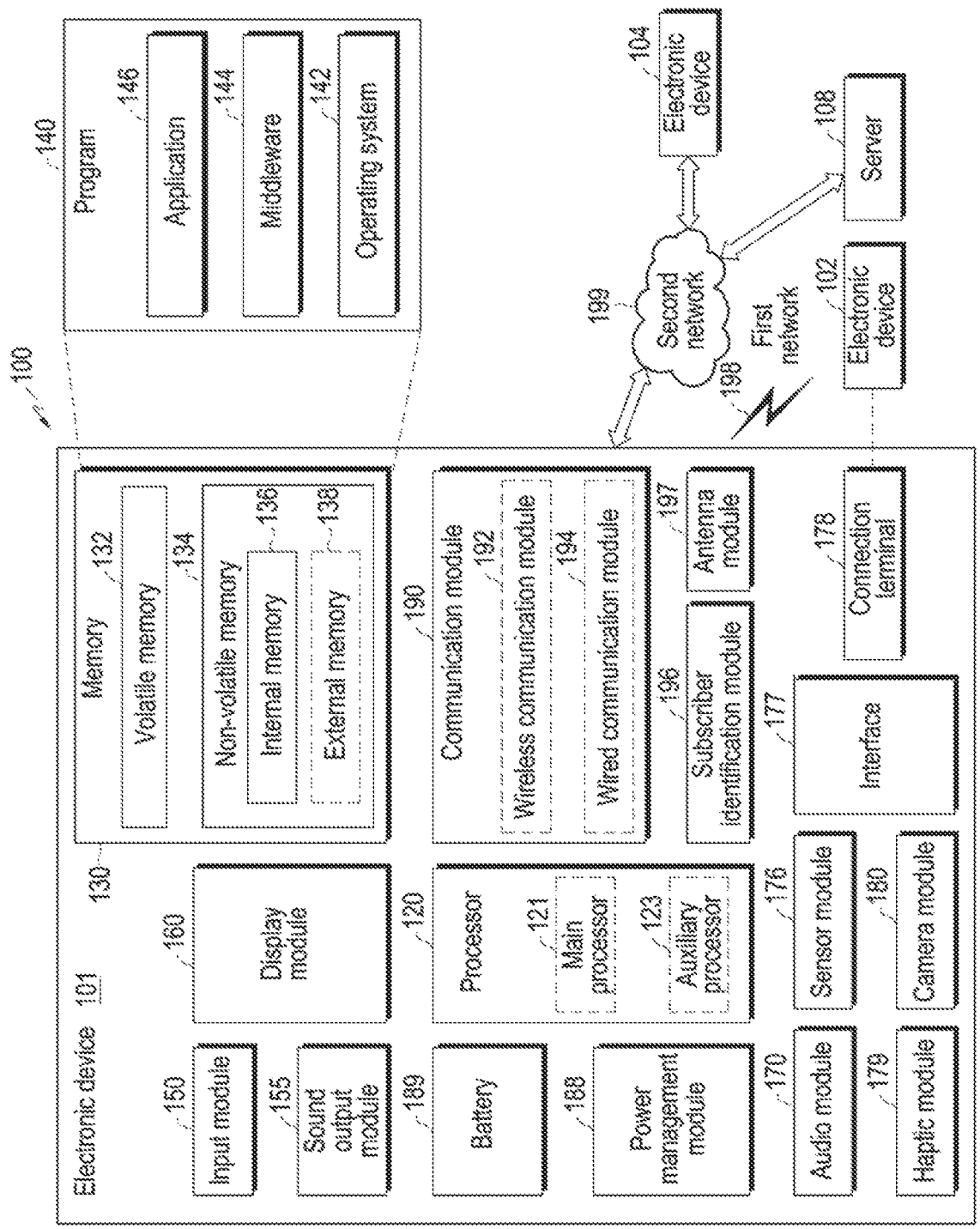
FIG. 1 is a block diagram illustrating an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
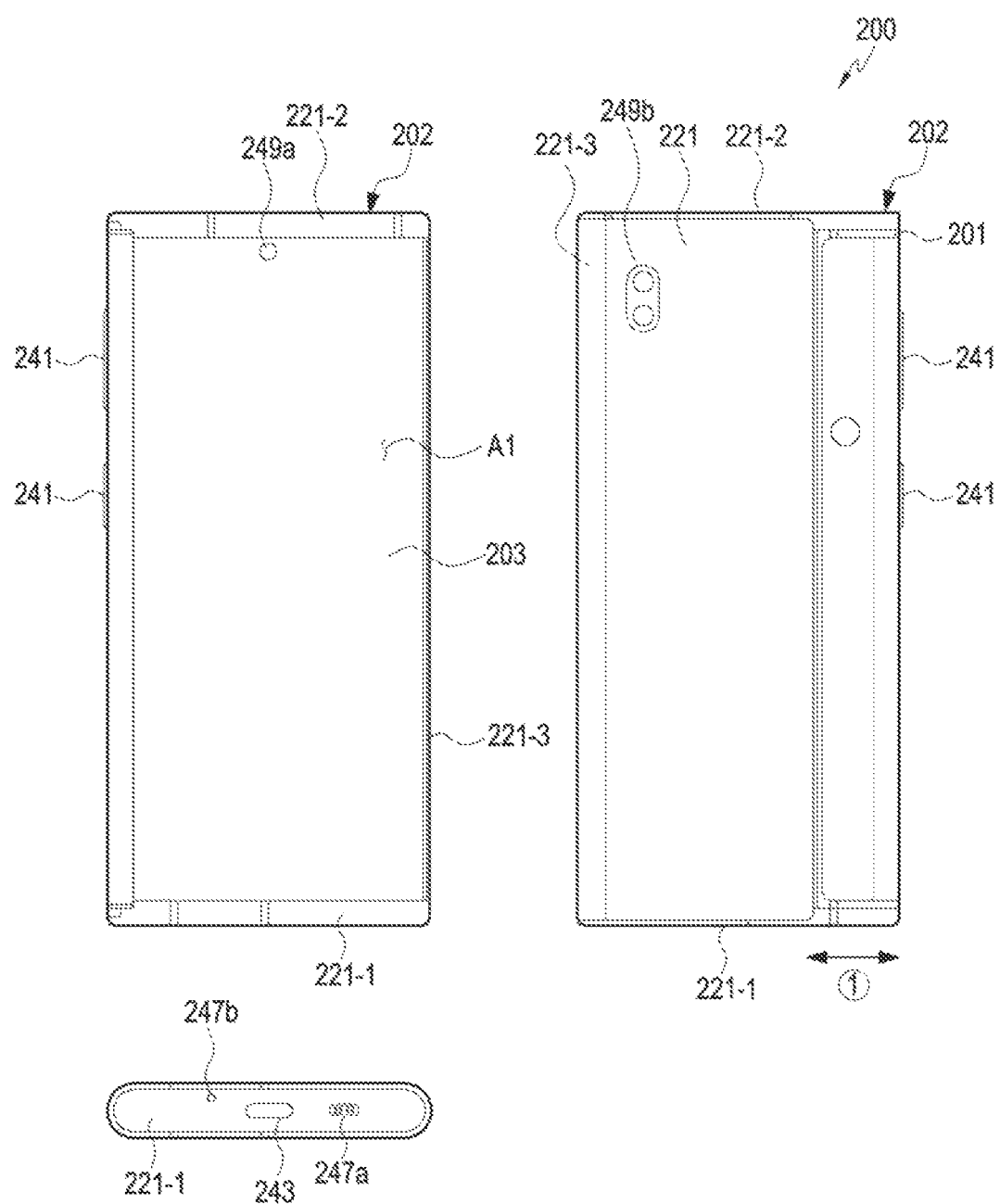
FIG. 2 is a diagram illustrating a state in which a second display area of a flexible display is accommodated in a second housing according to an embodiment of the disclosure.
Figure 3:
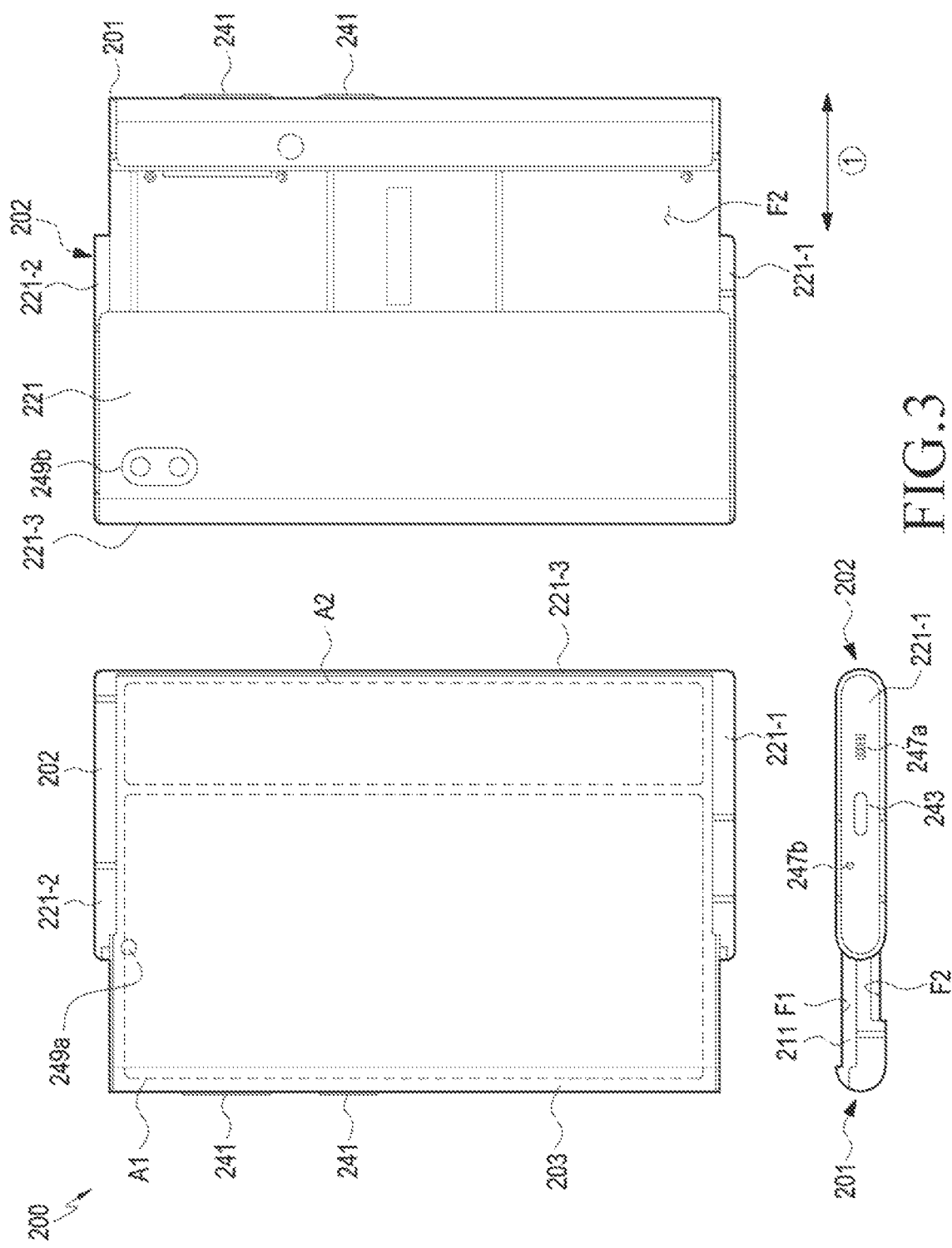
FIG. 3 is a diagram illustrating a state in which a second display area of a flexible display is visually exposed outward from a second housing according to an embodiment of the disclosure.

FIG. 2 is a diagram illustrating a state in which a second display area of a flexible display is accommodated in a second housing according to an embodiment of the disclosure. FIG. 3 is a diagram illustrating a state in which the second display area of the flexible display is visually exposed outward from the second housing according to an embodiment of the disclosure.

The state illustrated in FIG. 2 may be the state in which a first housing 201 is closed with respect to a second housing 202, and the state illustrated in FIG. 3 may be the state in which the first housing 201 is open with respect to the second housing 202. According to an embodiment, the "closed state" or the "opened state" may refer to when the electronic device is closed or opened.

Referring to FIGS. 2 and 3, a portable device 200 (e.g., the electronic device 101 of FIG. 1) may include the housings 201 and 202. The housings 201 and 202 may include the second housing 202 and the first housing 201 disposed to be movable with respect to the second housing 202. In some embodiments, the portable device 200 may include structures such that at least a part of the second housing 202 is slidably disposed on the first housing 201. According to an embodiment, the first housing 201 may be disposed to be reciprocally movable for a predetermined distance in the illustrated direction ① with respect to the second housing 202, for example.

According to an embodiment, the first housing 201 may be referred to as, for example, a first structure, a slide unit, or a slide housing, and may be disposed to be reciprocally movable on the second housing 202. According to an embodiment, the second housing 202 may be referred to as, for example, a second structure, a main unit, or a main housing, and include various electrical and electronic components such as a substrate or a battery. A part (e.g., first display area A1) of a flexible display 203 (e.g., the display module 160 of FIG. 1) may be disposed in the first housing 201. According to an embodiment, as the first housing 201 moves (e.g., slides) relative to the second housing 202, another part (e.g., second display area A2) of the flexible display 203 may be accommodated in the second housing 202 (e.g., a slide-in operation) or may be visually exposed outward from the second housing 202 (e.g., a slide-out operation). According to an embodiment, the first housing 201 may include a slide plate 211. The slide plate 211 may support at least a part of the flexible display 203. The slide plate 211 may include a first face F1 and a second face F2 facing in a direction opposite to the first face F1.

According to an embodiment, the second housing 202 may include a support member 221. The support member 221 may be open at one side (e.g., the front face) to accommodate (or surround) at least a part of the slide plate 211. For example, at least a part of the first housing 201 may be located in the second housing 202 while being surrounded by the second housing 202, and the first housing 201 may slide in the direction of the arrow ① with the guidance of the second housing 202.

According to an embodiment, the support member 221 may include a first sidewall 221-1, a second sidewall 221-2 substantially parallel to the first sidewall 221-1, and a third sidewall 221-3 substantially perpendicular to the second sidewall 221-2. According to an embodiment, the first sidewall 221-1, the second sidewall 221-2, and the third sidewall 221-3 of the support member 221 may surround at least a part of the first housing 201. According to an embodiment, the support member 221, the first sidewall 221-1, the second sidewall 221-2, and the third sidewall 221-3 may be integrated together or integrally formed. According to another embodiment, the support member 221, the first sidewall 221-1, the second sidewall 221-2, and the third sidewall 221-3 may be formed as separate components and combined or assembled together.

According to an embodiment, the support member 221 may cover at least a part of the flexible display 203. For example, at least a part of the flexible display 203 may be accommodated in the second housing 202, and the support member 221 may cover the part of the flexible display 203 accommodated in the second housing 202.

According to an embodiment, the first housing 201 may move in a first direction (e.g., ① direction) substantially parallel to the first sidewall 221-1 or the second sidewall 221-2 of the support member 221 with respect to the second housing 202, so that the first housing 201 can be in the opened state and the closed state. The first housing 201 may move to be located at a first distance from the third sidewall 221-3 in the closed state and at a second distance greater than the first distance from the third sidewall 221-3 in the opened state. In some embodiments, the first housing 201 may face at least a part of the third sidewall 221-3 in the closed state.

According to an embodiment, the portable device 200 may include the flexible display 203, key input devices 241, a connector hole 243, audio modules 247a and 247b, or camera modules 249a and 249b. While not shown, the portable device 200 may further include an indicator (e.g., a light emitting diode (LED) device) or various sensor modules. The configurations of the flexible display 203, the audio modules 247a and 247b, and the camera modules 249a and 249b of FIGS. 2 and 3 may be wholly or partially identical to the configurations of the display module 160, the audio module 170, and the camera module 180 of FIG. 1.

According to an embodiment, the flexible display 203 may include the first display area A1 and the second display area A2. According to an embodiment, the first display area A1 may be visually exposed outward from the portable device 200 in the closed state (e.g., FIG. 2) and the opened state (e.g., FIG. 3) of the portable device 200. For example, at least a part of the first display area A1 may be disposed on the first housing 201. Further, at least a part of the first display area A1 may extend substantially across at least a part of the first face F1 to be disposed on the slide plate 211. According to an embodiment, the second display area A2 may be located inside the portable device 200 in the closed state (e.g., FIG. 2) of the portable device 200 and may be visually exposed outward from the portable device 200 in the opened state (e.g., FIG. 3) of the portable device 200. For example, the second display area A2 may extend from the first display area A1, and may be inserted or accommodated into the second housing 202 (e.g., structure) or visually exposed outward from the second housing 202, depending on the sliding movement of the first housing 201.

According to an embodiment, the second display area A2 may move in connection with a roller mounted on the second housing 202 to be accommodated in the second housing 202 or visually exposed outward from the second housing 202. According to an embodiment, the second display area A2 may move based on the sliding movement of the first housing 201 in the first direction (e.g., the direction indicated by the arrow ①). For example, a part of the second display area A2 may be deformed to be curved at a position corresponding to the roller, while the first housing 201 slides.

According to an embodiment, when the first housing 201 moves from the closed state to the opened state, the second display area A2 may be gradually exposed outward from the second housing 202 and be substantially coplanar with the first display area A1, when viewed from above the slide plate 211. The flexible display 203 may be coupled with or disposed adjacent to a touch sensing circuit, a pressure sensor that may measure the intensity (pressure) of a touch, and/or a digitizer detecting a magnetic field-type stylus pen. In an embodiment, the second display area A2 may be at least partially accommodated in the second housing 202, such that even in the state illustrated in FIG. 1 (i.e., the closed state), the second display area A2 may be partially exposed outward. According to an embodiment, a part of the exposed second display area A2 may be located on the roller regardless of the electronic device being in the closed state or the opened state, such that a part of the second display area A2 is always bent at the position corresponding to the roller.

According to an embodiment, the key input devices 241 may be disposed on the second housing 202. For example, the key input devices 241 may be disposed on the third sidewall 221-3. In another example, the key input devices 241 may be disposed on the second sidewall 221-2 or the first sidewall 221-1. Depending on the design of the portable device 200, the portable device 200 may not include the illustrated key input devices 241 or include additional key input device(s). According to an embodiment, the portable device 200 may include a key input device such as a home key button or a touch pad disposed around the home key button (not shown). According to another embodiment, at least a part of the key input devices 241 may be located in one area of the first housing 201.

According to an embodiment, the connector hole 243 may be implemented to accommodate a connector (e.g., USB connector) for transmitting/receiving power and/or data to and from an external electronic device. Alternatively, the connector hole 243 may be omitted from the portable device 200. While not shown, the portable device 200 may include a plurality of connector holes 243, and one of the connector hole 243 may function as the connector hole for transmitting and receiving audio signals to and from an external electronic device. In the illustrated embodiment, the connector hole 243 is disposed on the third sidewall 223c, which should not be construed as limiting the disclosure. The connector hole 243 may be disposed on the first sidewall 221-1 or the second sidewall 221-2.

According to an embodiment, the audio modules 247a and 247b may include at least one speaker hole 247a or at least one microphone hole 247b. The speaker hole 247a may be provided as a receiver hole for voice calls and/or an external speaker hole. The portable device 200 may include a microphone for obtaining sound, and the microphone may obtain an external sound of the portable device 200 through the microphone hole 247b. According to an embodiment, the portable device 200 may include a plurality of microphones to detect the direction of sound. According to an embodiment, the speaker hole 247a and the microphone hole 247b may be implemented as one hole, or a speaker (e.g., piezo speaker) may be included without the speaker hole 247a.

According to an embodiment, the speaker hole 247a or the microphone hole 247b may be disposed in the second housing 202.

According to an embodiment, the camera module 249b may be located in the second housing 202 and capture images in a direction opposite to the first display area A1 of the flexible display 203. The portable device 200 may include a plurality of camera modules. For example, the portable device 200 may include at least one of a wide-angle camera, a telephoto camera, or a close-up camera, and according to an embodiment, include an IR projector and/or an IR receiver to measure the distance to a subject. The camera modules 249a and 249b may include one or more lenses, an image sensor, and/or an image signal processor. The portable device 200 may further include another camera module 249a for capturing a subject in a direction opposite to the camera module 249b. For example, the other front camera may be disposed around the first display area A1 or in an area overlapping with the flexible display 203. When disposed in the area overlapping with the flexible display 203, the other front camera may capture a subject through a hole formed on the flexible display 203 or through the flexible display 203.

According to an embodiment, an indicator (not shown) of the portable device 200 may be disposed in the first housing 201 or the second housing 202, and include an LED to provide state information about the portable device 200 by a visual signal. A sensor module (not shown) of the portable device 200 may generate an electrical signal or data value corresponding to an internal operating state or external environmental state of the portable device 200. The sensor module may include, for example, a proximity sensor, a fingerprint sensor, or a biometric sensor (e.g., an iris/face recognition sensor or a heart rate monitor (HRM) sensor). In another embodiment, the sensor module may further include, for example, at least one of a gesture sensor, a gyro sensor, a barometric pressure sensor, a magnetic sensor, an acceleration sensor, a grip sensor, a color sensor, an IR sensor, a temperature sensor, a humidity sensor, or an illuminance sensor.

According to an embodiment of the disclosure, the portable device 200 may include a motor module (not shown). According to an embodiment, the motor module may generate a rotational force by using power received from a battery (e.g., the battery 189 of FIG. 1). According to an embodiment of the disclosure, the motor module may slide the first housing 201. For example, the motor module may include at least one of a motor core (e.g., servo motor or step motor) that converts electric power into rotational force to generate the driving force for sliding movement of the first housing 201, a motor rail (e.g., rack gear), or at least one gear (e.g., pinion) coupled to the motor core and configured to rotate with respect to the motor rail. According to an embodiment of the disclosure, the motor module may be coupled to the first housing 201. For example, the motor rail may be disposed on the slide plate 211 of the first housing 201, and the motor core may be located in the second housing 202. According to an embodiment of the disclosure, as the gear coupled to the motor core rotates, the first housing 201 may slide with respect to the second housing 202.

Figure 4:
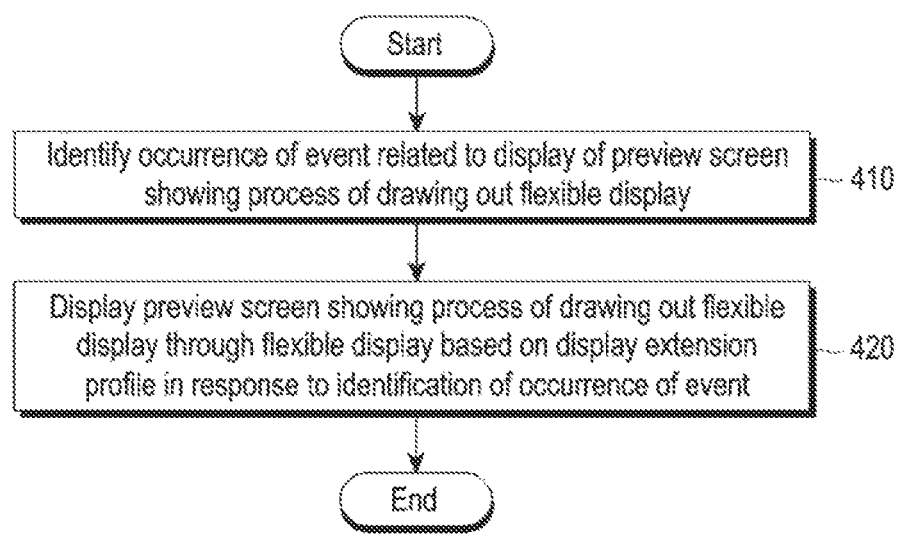
FIG. 4 is an exemplary flowchart illustrating a function or operation of displaying a preview screen on a flexible display according to an embodiment of the disclosure.
Figure 5:
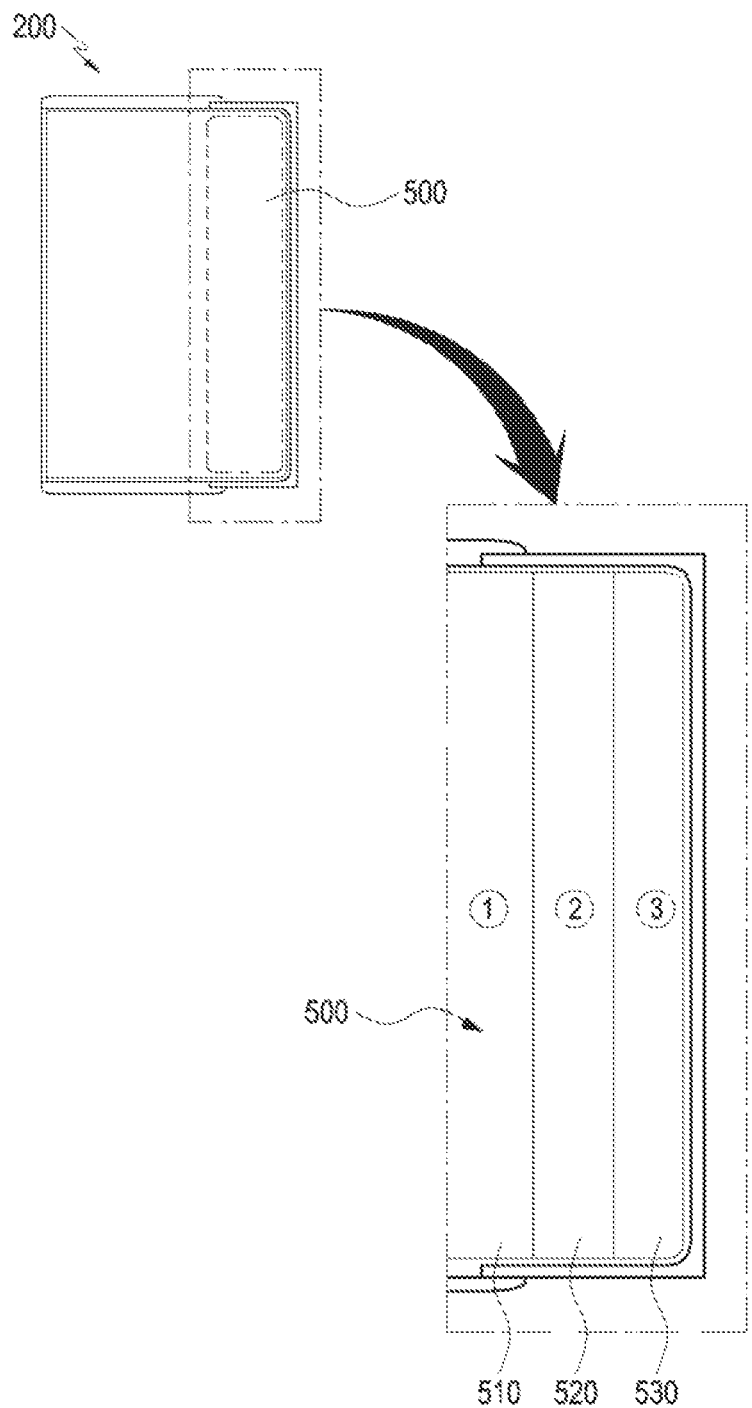
FIG. 5 is an exemplary diagram illustrating an extension area and an extension section according to an embodiment of the disclosure.
Figure 6:
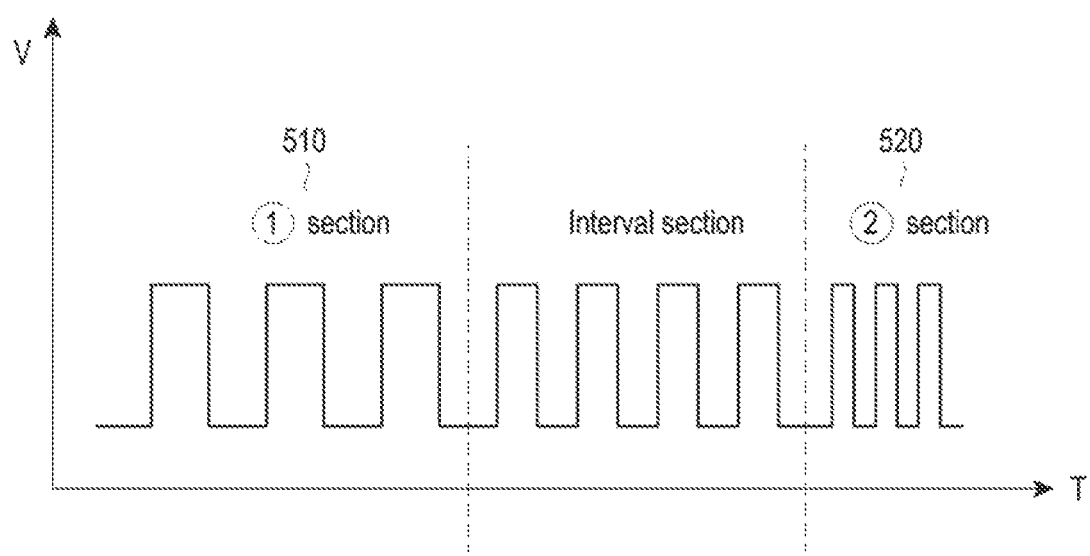
FIG. 6 is an exemplary diagram illustrating a case in which a different extension section speed is set for each extension section according to an embodiment of the disclosure.

FIG. 4 is an exemplary flowchart illustrating a function or operation of displaying a preview screen on a flexible display according to an embodiment of the disclosure. FIG. 5 is an exemplary diagram illustrating an extension area 500 and an extension section (e.g., a first extension section 510, a second extension section 520, and a third extension section 530) according to an embodiment of the disclosure. FIG. 6 is an exemplary diagram illustrating a case in which a different extension section speed is set for each extension section according to an embodiment of the disclosure. FIGS. 7A to 7D are exemplary diagrams illustrating screens on which a user sets an extension section (e.g., the first extension section 510, the second extension section 520, and the third extension section 530) and an extension section speed.

Figure 7A:
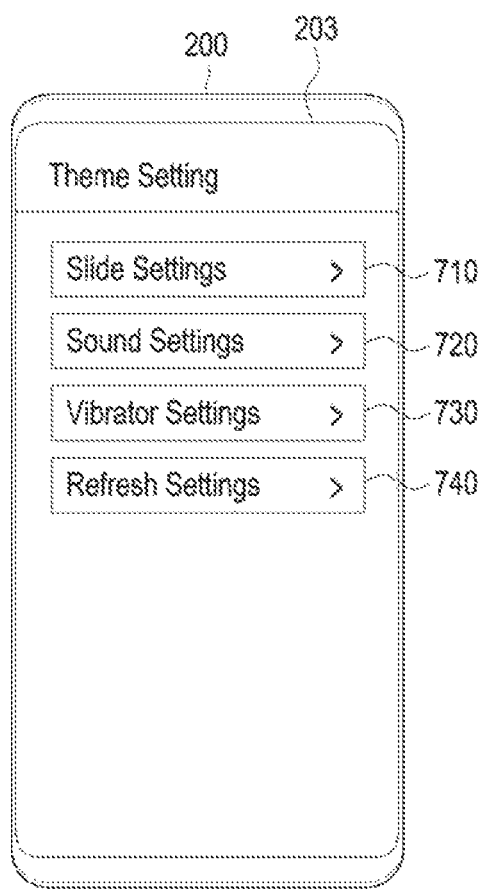
FIGS. 7A to 7D are exemplary diagrams illustrating screens on which a user sets an extension section and an extension section speed.

Referring to FIG. 4, the portable device 200 (e.g., the electronic device 101 of FIG. 1) according to an embodiment of the disclosure may identify occurrence of an event related to display of a preview screen 712 showing a process of drawing out the flexible display 203 in operation 410. The event related to the display of the preview screen 712 according to an embodiment of the disclosure may include reception of a user input for displaying a theme selection screen (e.g., the screen illustrated in FIG. 7B) (e.g., reception of a first menu 710 in FIG. 7A), or reception of a user input for setting an extension section and an extension section speed. Besides these events, the event may further include various events such as reception of a user input on a user interface (e.g., icon or menu) for displaying a preview screen on the flexible display 203. In FIG. 7A, an exemplary screen including menus for setting various attributes of the extension of the exposed area of the flexible display 203 (for convenience of description, referred to as extension of the flexible display 203) is illustrated. Referring to FIG. 7A, the portable device 200 according to an embodiment of the disclosure may display a screen including at least one of the first menu 710 configured to display a screen for setting an extension section and an extension section speed according to an embodiment of the disclosure, a second menu 720 configured to display a screen for setting a sound volume, a sound play speed, and/or output sound content, for each extension section (e.g., the first extension section 510, the second extension section 520, and the third extension section 530), a third menu 730 configured to display a screen for setting the intensity of vibration, for each extension section (e.g., the first extension section 510, the second extension section 520, and the third extension section 530), and/or a fourth menu 740 configured to display a screen for setting a refresh period, for each extension section (e.g., the first extension section 510, the second extension section 520, and the third extension section 530), on the portable device 200 (e.g., the display module 160 of FIG. 1). According to an embodiment of the disclosure, an icon showing at least one of attributes set through the first menu 710 to the fourth menu 740 that was determined automatically (e.g., according to a setting of the portable device 200) may further be provided. While certain embodiments of the disclosure have been described based on an embodiment in which the exposed area of the flexible display 203 is extended in the disclosure (e.g., FIG. 4 and FIGS. 7A to 7D), they are merely examples. When the exposed area of the flexible display 203 shrinks, the description given in the disclosure (e.g., FIG. 4 and FIGS. 7A to 7D) may be applied equally or with modification (e.g., in a reverse manner).

The preview screen 712 according to an embodiment of the disclosure may be a screen visually providing a user interface for configuring the process of extending or drawing out (for convenience of description, the term "extending" is used herein) the flexible display 203. The flexible display 203 according to an embodiment of the disclosure may be extended at the same speed or at a different speed in each extension section (e.g., the first extension section 510, the second extension section 520, and the third extension section 530) according to user setting or manufacturer setting.

Referring to FIG. 5, the portable device 200 according to an embodiment of the disclosure may be switched from a shrunken state to an extended state, and in this case, may include an extension area 500. The extension area according to an embodiment of the disclosure may include, for example, three extension sections (e.g., the first extension section 510, the second extension section 520, and the third extension section 530). A different extension speed may be set for each of the three extension sections according to an embodiment of the disclosure. The portable device (e.g., the processor 120 of FIG. 1) according to an embodiment of the disclosure may determine how much a housing (e.g., the first housing 201 and/or the second housing 202) or the flexible display 203 has moved (e.g., has been extended) using various methods. One such method uses magnetic force sensing, in which how much the housing (e.g., the first housing 201 and/or the second housing 202) or the flexible display 203 has moved is determined by arranging magnets in a flat or circular shape and recognizing the change in magnetic force. Another method uses dielectric constant change, in which how much the housing (e.g., the first housing 201 and/or the second housing 202) or the flexible display 203 has moved is determined by disposing an element whose dielectric constant changes along with the movement of the housing (e.g., the first housing 201 and/or the second housing 202) or the flexible display 203, on a structure related to the movement of the housing (e.g., the first housing 201 and/or the second housing 202) or the flexible display 203 and by using a sensor that may sense a change in the dielectric constant). Yet another method uses inductance change, in which how much the housing (e.g., the first housing 201 and/or the second housing 202) or the flexible display 203 has moved is determined by disposing an element whose inductance along with movement of the housing (e.g., the first housing 201 and/or the second housing 202) or the flexible display 203, on a structure related to movement of the housing (e.g., the first housing 201 and/or the second housing 202) or the flexible display 203 and by using a sensor that may sense a change in the inductance. Still yet another method uses resistance change, in which how much the housing (e.g., the first housing 201 and/or the second housing 202) or the flexible display 203 has moved is determined by sensing a change in resistance along with movement of the housing (e.g., the first housing 201 and/or the second housing 202) or the flexible display 203). Still yet another method of determining the movement distance of the housing (e.g., the first housing 201 and/or the second housing 202) or the flexible display 203 is done by counting the number of revolutions of a motor. And still yet another method of determining distance is by radiating light to the housing (e.g., the first housing 201 and/or the second housing 202) or the flexible display 203, capturing an image of the housing (e.g., the first housing 201 and/or the second housing 202) or the flexible display 203, and determining how much the housing (e.g., the first housing 201 and/or the second housing 202) or the flexible display 203 has moved by using the captured image. The portable device 200 (e.g., the processor 120 of FIG. 1) according to an embodiment of the disclosure may control the speed of each extension section by controlling a pulse width modulation (PWM) frequency of the motor. Referring to FIG. 6, the portable device 200 (e.g., the processor 120 of FIG. 1) according to an embodiment of the disclosure may set the PWM frequency of the motor to be lower in the first extension section 510 than in the second extension section 520 (e.g., when the first extension section 510 is set to be extended more slowly than the second extension section 520). That is, the portable device 200 (e.g., the processor 120 of FIG. 1) according to an embodiment of the disclosure may set the PWM frequency of the motor to be higher in the second extension section 520 than in the first extension section 510 (e.g., when the second extension section 520 is set to be extended faster than the first extension section 510). According to an embodiment of the disclosure, for natural switching between extension speeds, the PWM frequency of the motor may be set to a frequency value between the frequency of the first extension section 510 and the frequency of the second extension section 520 (e.g., the average value of the frequency of the first extension section 510 and the frequency of the second extension section 520) in an interval section between the first extension section 510 and the second extension section 520 (e.g., section overlapping the first extension section 510 and the second extension section 520 by a predetermined ratio). Accordingly, the driving speed of the motor in the interval section may be between the driving speed of the first extension section 510 and the driving speed of the second extension section 520. Alternatively, the PWM frequency in the interval section according to an embodiment of the disclosure may be set to increase or decrease at specified intervals. Accordingly, the driving speed of the motor in the interval section may gradually increase or decrease. According to an embodiment of the disclosure, the majority of the interval section may overlap with the first extension section 510, and may span a part of the first extension section 510 and a part of the second extension section 520. The PWM frequency of the motor as illustrated in FIG. 6 may be controlled by controlling at least one of the voltage and/or current applied to the motor or the duty cycle of the motor. For example, the portable device 200 according to an embodiment of the disclosure may increase the driving speed of the motor by increasing the duty cycle of the motor, thereby increasing the extension speed of the flexible display 203.

The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

Figure 7B:
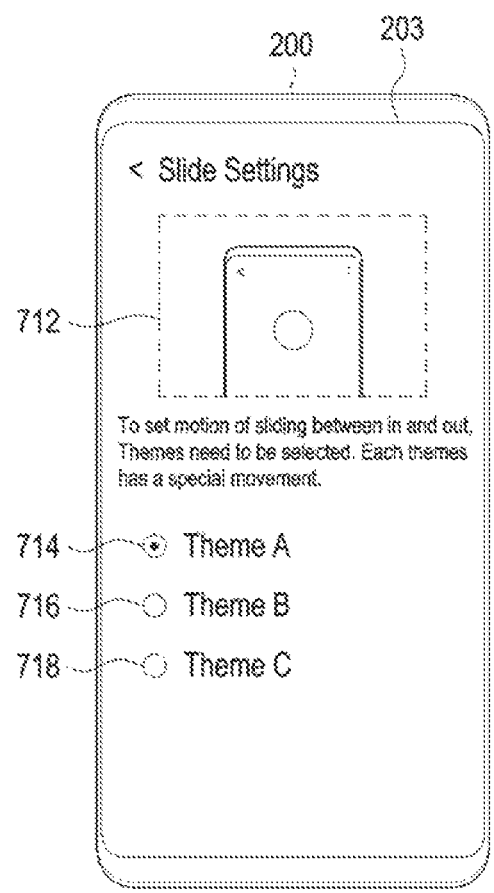
Figure 7C:
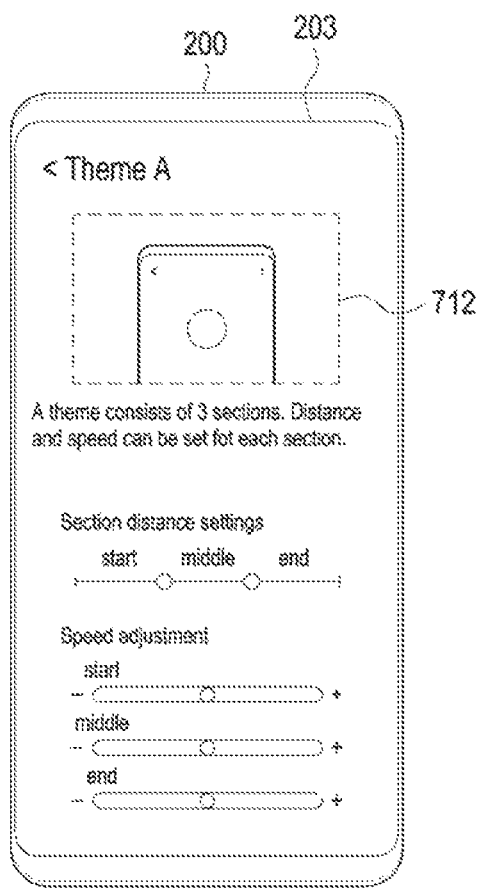

In operation 420, the portable device 200 according to an embodiment of the disclosure may display the preview screen 712 showing the process of drawing out the flexible display 203 based on a display extension profile of the flexible display 203 in response to the identification of the occurrence of the event. The portable device 200 according to an embodiment of the disclosure may identify occurrence of an event such as reception of a selection input for the first menu 710. The portable device 200 according to an embodiment of the disclosure may display a theme selection screen as illustrated in FIG. 7B on the portable device 200 based on the reception of the selection input for the first menu 710. According to an embodiment of the disclosure, slide settings (e.g., set values of extension sections and extension section speeds) may be selected as theme A (e.g., the current theme in use for the user), and the portable device 200 may display the preview screen 712 by using the display extension profile (in other words, "slide settings") of theme A. The term "theme" used herein may refer to a set of elements packaged so that various display elements such as background screen, font, and/or emoticon may be collectively changed. According to an embodiment of the disclosure, at least one of the extension section, the extension section speed, the output sound volume, the sound play speed, the output sound pitch, sound content to be output, or the intensity of a vibration to be output may be included as an element of the "theme". Referring to FIG. 7B, the preview screen 712 and at least one theme (e.g., theme A 714, theme B 716, and theme C 718) may be displayed on the theme selection screen according to an embodiment of the disclosure. When any one theme (e.g., theme A 714) is selected by the user, the portable device 200 according to an embodiment of the disclosure may display a screen for configuring the extension section and the extension section speed as illustrated in FIG. 7C. However, according to another embodiment of the disclosure, when a theme (e.g., theme A 714) is selected by the user, the portable device 200 according to the embodiment of the disclosure may display the preview screen 712 on the theme selection screen by using a display extension profile corresponding to the selected theme. In this case, the portable device 200 according to an embodiment of the disclosure may further display a screen switching icon (not shown) for displaying the screen as illustrated in FIG. 7C. According to an embodiment of the disclosure, the display extension profile may be stored in the portable device 200 (e.g., the memory 130 of FIG. 1). When the flexible display 203 is extended, the portable device 200 according to an embodiment of the disclosure may change or correct the extension profile to match the refresh rate required by the images displayed in the extension sections and thus operate the motor according to the corrected extension profile. For example, when the image being reproduced requires a relatively high refresh rate, the portable device 200 according to an embodiment of the disclosure may drive the motor relatively fast. To this end, a lookup table defining the relationship between refresh rates and/or the speeds at which images being reproduced are changing and driving speeds of the motor may be stored in the portable device 200 according to an embodiment of the disclosure. The portable device 200 according to an embodiment of the disclosure may control the motor by determining the driving speed of the motor based on the lookup table. According to an embodiment of the disclosure, the refresh rates and/or the speeds at which images being reproduced are changing may be learned by using an artificial intelligence model. The learning may be performed, for example, in the portable device 200 or through a separate server (e.g., the server 108 of FIG. 1). A learning algorithm according to an embodiment of the disclosure may include, but not limited to, for example, supervised learning, unsupervised learning, semi-supervised learning, or reinforcement learning. The artificial intelligence model according to an embodiment of the disclosure may include a plurality of artificial neural network layers. An artificial neural network according to an embodiment of the disclosure may be, but not limited to, a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-networks, or a combination of two or more of the above networks. The artificial intelligence model according to an embodiment of the disclosure may include a software structure in addition to, or alternatively to, a hardware structure.

Figure 7D:
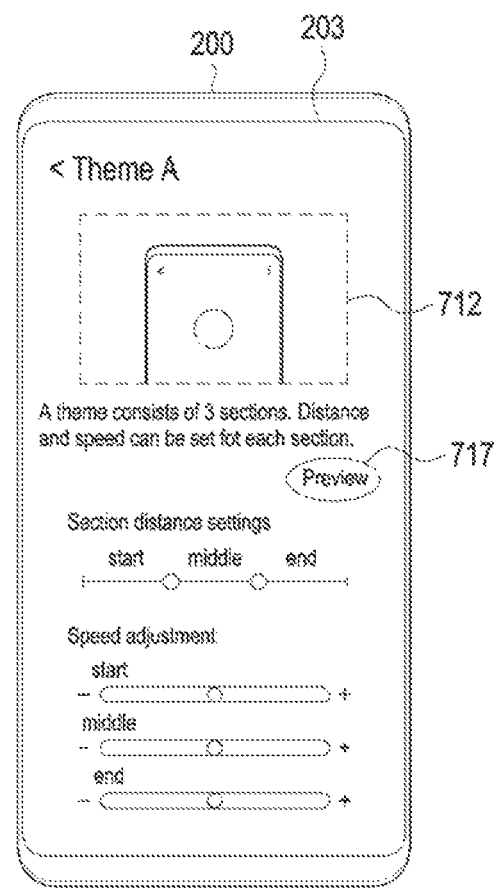

Referring to FIG. 7C, upon user selection of a theme (e.g., theme A 714) on a theme selection screen, the portable device 200 according to an embodiment of the disclosure may display a screen allowing the user to configure the extension sections and extension section speeds. The portable device 200 according to an embodiment of the disclosure may set extension section lengths according to user input (e.g., drag input of a circular element) to the "section distance settings" section of the screen. The portable device 200 according to an embodiment of the disclosure may set the extension section speed according to user input (e.g., drag input of a circular element) to the "speed adjustment" section of the screen. For example, when the user moves the circular element in the "+" direction in the "speed adjustment" section, the portable device 200 according to an embodiment of the disclosure may set the extension speed to be relatively high. Similarly, when the user moves the circular element in the "−" direction in the "speed adjustment" section, the portable device 200 according to an embodiment of the disclosure may set the extension speed to be relatively low. When the portable device 200 according to an embodiment of the disclosure identifies occurrence of an event (e.g., reception of a user input for setting the extension section and the extension section speed), which is different from the event of reception of a selection input for the first menu 710, the portable device 200 may display the preview screen 712. For example, when there is no user input until a specified time (e.g., 5 seconds) elapses after reception of the first extension section or extension section speed from the user, the portable device 200 according to an embodiment of the disclosure may display the preview screen 712. Alternatively, as illustrated in FIG. 7D, upon receipt of a selection input for a preview screen play icon 717 from the user, the portable device 200 may display the preview screen 712. The preview screen 712 according to an embodiment of the disclosure may include video (e.g., animation). The animation and/or video according to an embodiment of the disclosure may show moving images representing sliding movement of the portable device 200. The animation and/or video may be different depending on the various themes selected by the user. The animation and/or video according to an embodiment of the disclosure will be described later in more detail with reference to FIGS. 17 to 21. The portable device 200 according to an embodiment of the disclosure may output sound corresponding to the extension section speed, while outputting the preview screen 712. To this end, the portable device 200 according to an embodiment of the disclosure may pre-store sounds corresponding to each extension section speed in the portable device 200 (e.g., the memory 130 of FIG. 1).

Figure 8:
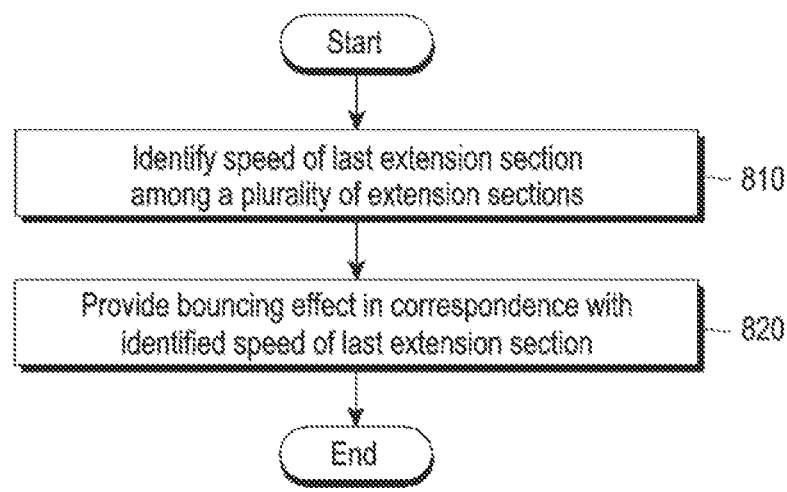
FIG. 8 is an exemplary flowchart illustrating a function or operation of providing a bouncing effect by a portable device according to an embodiment of the disclosure.
Figure 9A:
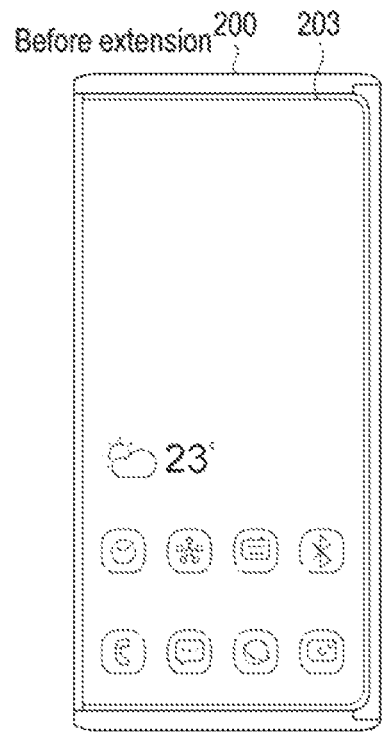
FIGS. 9A to 9D are exemplary diagrams illustrating a function or operation of providing a bouncing effect, when a flexible display is extended according to an embodiment of the disclosure.
Figure 9B:
Figure 9C:
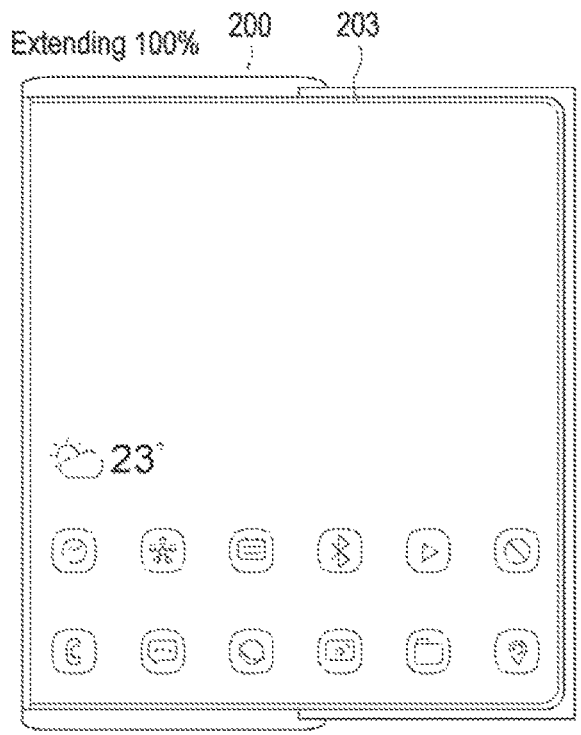
Figure 9D:
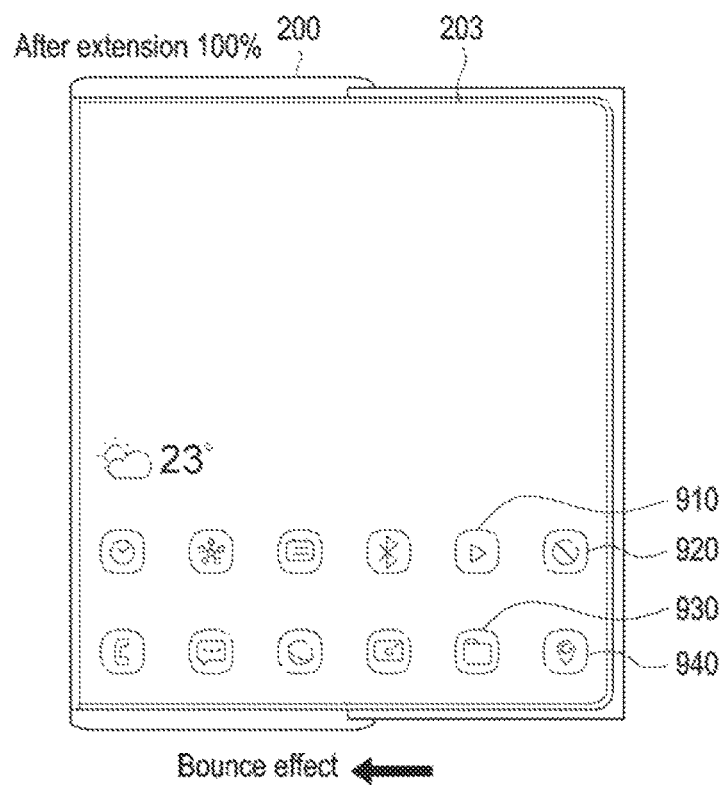
Figure 10A:
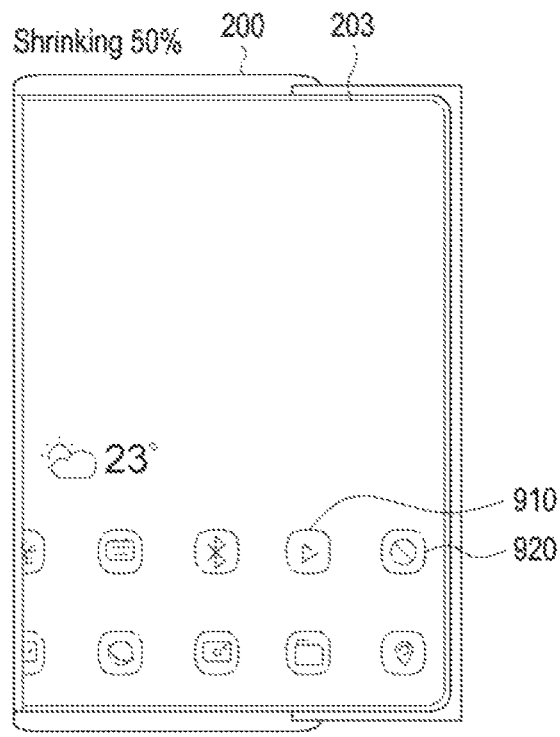
FIGS. 10A and 10B are exemplary diagrams illustrating a function or operation of providing a bouncing effect, when a flexible display shrinks according to an embodiment of the disclosure.
Figure 10B:
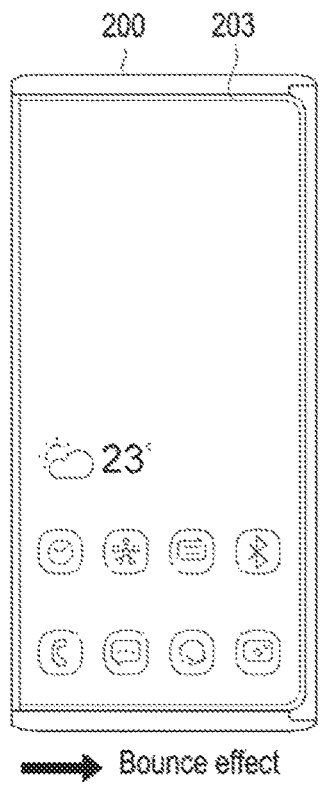

FIG. 8 is an exemplary flowchart illustrating a function or operation of providing a bouncing effect by the portable device 200 according to an embodiment of the disclosure. FIGS. 9A to 9D are exemplary diagrams illustrating a function or operation of providing a bouncing effect, when the flexible display 203 is extended according to an embodiment of the disclosure. FIGS. 10A, 10B and 10C are exemplary diagrams illustrating a function or operation of providing a bouncing effect, when the flexible display 203 shrinks according to an embodiment of the disclosure.

In operation 810, the portable device 200 according to an embodiment of the disclosure may identify the speed of the last one (e.g., the third extension section 530) of a plurality of extension sections (e.g., the first extension section 510, the second extension section 520, and the third extension section 530). Operation 810 according to an embodiment of the disclosure may be performed while the flexible display 203 is extended according to an extension event (e.g., user input of a physical button) or before the extension event occurs. Referring to FIG. 9A, the portable device 200 according to an embodiment of the disclosure may display a first screen (e.g., home screen) on the flexible display 203. Referring to FIGS. 9B and 9C, the portable device 200 according to an embodiment of the disclosure may display the first screen by extending the layout (e.g., the spacing between icons) to match the width of the flexible display 203, while the flexible display 203 is being extended.

In operation 820, the portable device 200 according to an embodiment of the disclosure may provide a bouncing effect in correspondence with the identified speed of the last extension section. Referring to FIG. 9D, upon completion of the extension, the portable device 200 according to an embodiment of the disclosure may further display at least one icon (e.g., first icon 910, second icon 920, third icon 930, and fourth icon 940), which were not included in the first screen, while providing the bouncing effect. In this case, the portable device 200 according to an embodiment of the disclosure may provide the bouncing effect in correspondence with the speed of the last extension section (e.g., the third extension section 530). To this end, according to an embodiment of the disclosure, a lookup table defining the relationship between extension section speeds and strengths of the bouncing effect may be stored in the portable device 200 (e.g., the memory 130 of FIG. 1). When the flexible display 203 according to an embodiment of the disclosure shrinks, referring to FIG. 10A, at least one icon may disappear as if pushed into the portable device 200 due to the shrinking of the flexible display 203. When the portable device 200 completely shrinks, at least one icon (e.g., the first icon 910, the second icon 920, the third icon 930, and the fourth icon 940) which were not included in the first screen may disappear (e.g., bounce off the screen), and icons originally included in the first screen may be displayed on the first screen, while the bouncing effect is being provided, as illustrated in FIG. 10B. In this case, the portable device 200 according to an embodiment of the disclosure may provide the bouncing effect in correspondence with the speed of the first extension section (e.g., the first extension section 510). According to another embodiment of the disclosure, when the portable device 200 does not include a motor, the portable device 200 may sense the extended length of the flexible display 203 to provide the bouncing effect. In this case, the strength of the bouncing effect may be determined in proportion to the speed at which the flexible display 203 is extended. According to another embodiment, when it is determined that the flexible display 203 is completely extended, the bouncing effect may be provided regardless of the speed at which the flexible display 203 is extended.

Figure 11:
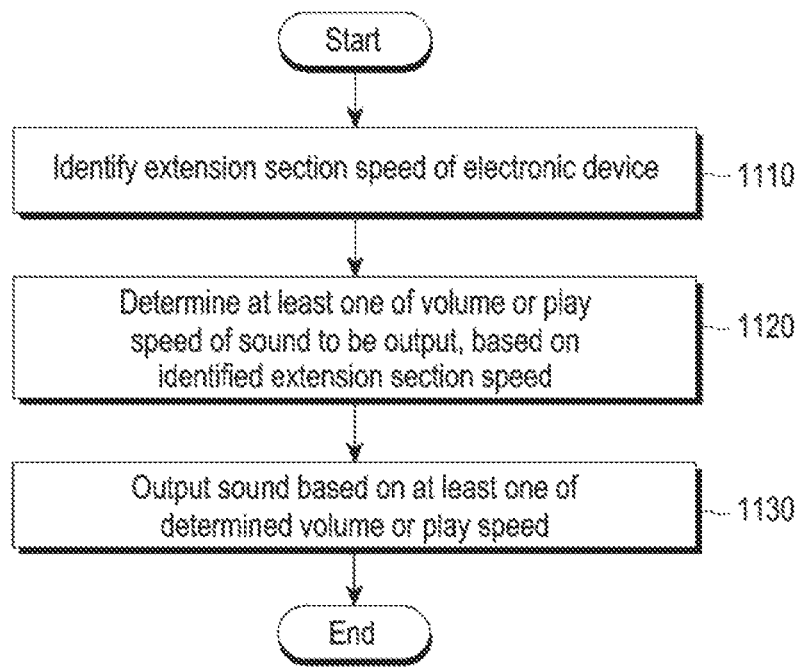
FIG. 11 is a flowchart and FIG. 12 is an exemplary diagram illustrating a function or operation of controlling at least one of volume or a play speed of sound to be output based on an extension section speed according to an embodiment of the disclosure.
Figure 12:
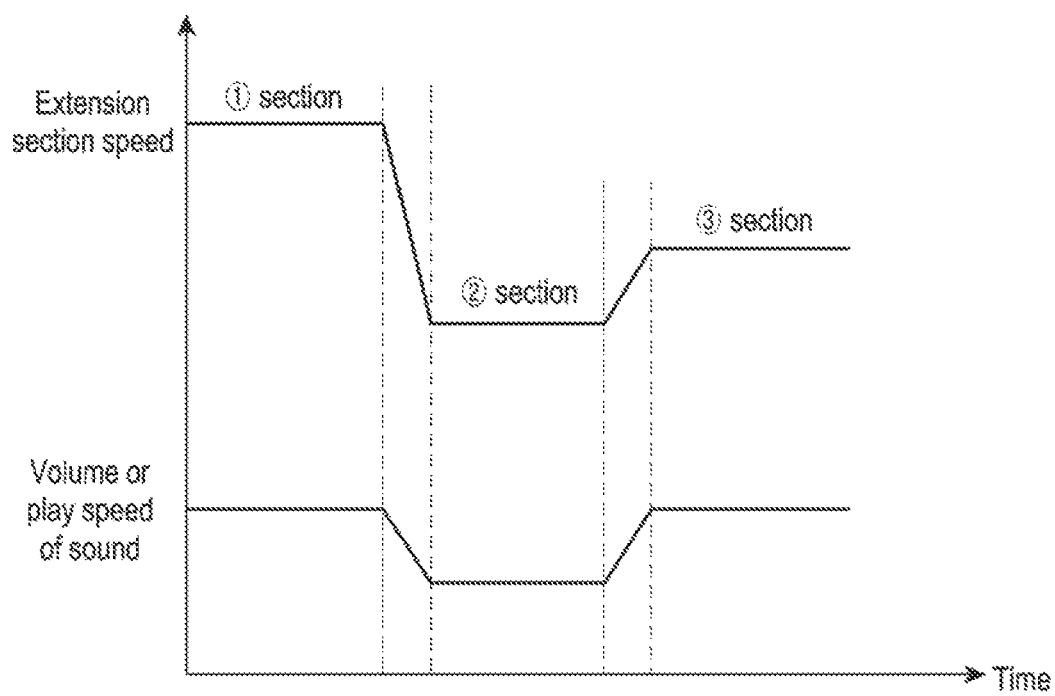

FIG. 11 is a flowchart and FIG. 12 is an exemplary diagram illustrating a function or operation of controlling at least one of volume or play speed of sound to be output based on an extension section speed according to an embodiment of the disclosure.

Referring to FIG. 11, the portable device 200 according to an embodiment of the disclosure may identify an extension section speed of the portable device 200 in operation 1110. Operation 1110 according to an embodiment of the disclosure may be performed, while the flexible display 203 is being extended according to an extension event (e.g., user input of a physical button) or before the extension event occurs. The extension section speed according to an embodiment of the disclosure may be set by the user or preset by the manufacturer of the portable device 200.

In operation 1120, the portable device 200 according to an embodiment of the disclosure may determine at least one of the volume or play speed of sound to be output based on the identified extension section speed. To this end, a lookup table defining the relationship between extension section speeds and volumes or play speeds of the sound to be output may be stored in in the portable device 200 (e.g., the memory 130 of FIG. 1) according to an embodiment of the disclosure. For example, as illustrated in FIG. 12, the volume or play speed of the sound to be output through the portable device 200 may be larger or higher in the extension section with the highest extension section speed (e.g., the first section 510), than in any other section. Similarly, the volume or play speed of the sound to be output through the portable device 200 may be smaller or lower in the extension section with the lowest extension section speed (e.g., the second section 520) than in any other section.

In operation 1130, the portable device 200 according to an embodiment of the disclosure may output the sound based on the determined at least one of the volume or the play speed. The portable device 200 according to an exemplary embodiment of the disclosure may output the sound, while extending the flexible display 203.

Figure 13:
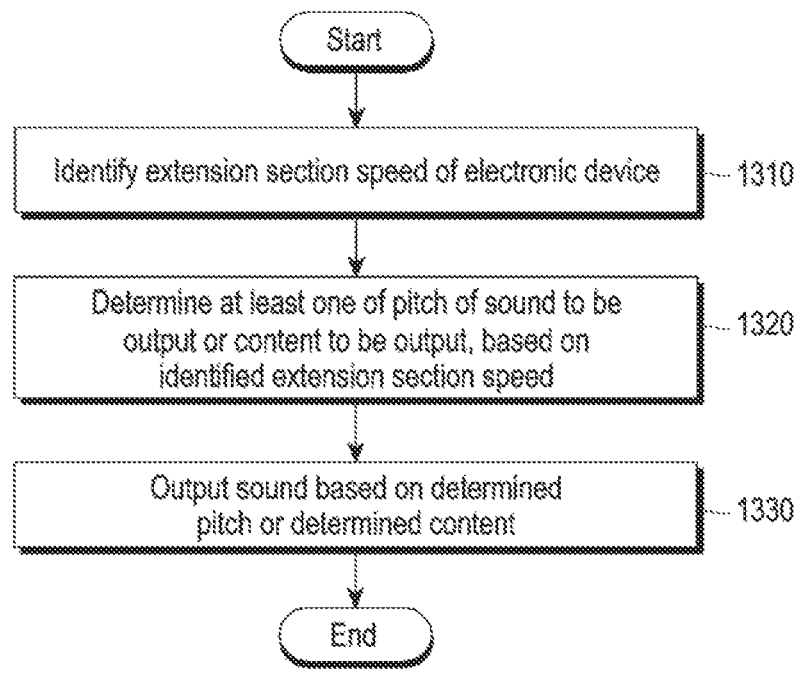
FIG. 13 is a flowchart and FIG. 14 is an exemplary diagram illustrating a function or operation of determining a pitch of sound to be output or content to be output, based on an extension section speed according to an embodiment of the disclosure.
Figure 14:
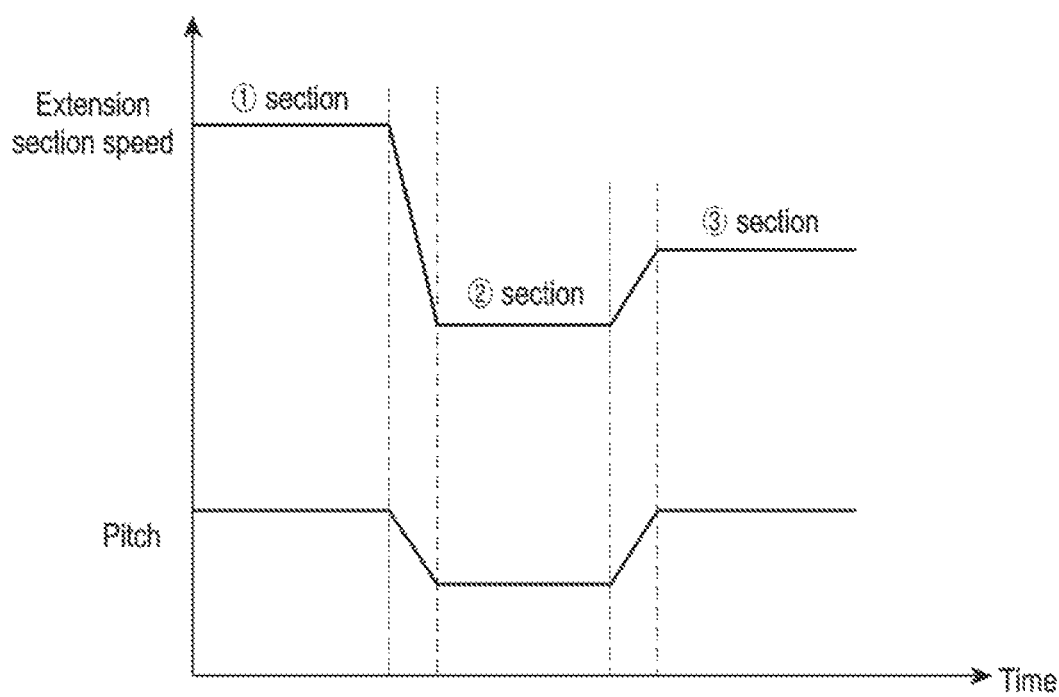

FIG. 13 is a flowchart and FIG. 14 is an exemplary diagram illustrating a function or operation of determining the pitch of sound to be output or content to be output based on an extension section speed according to an embodiment of the disclosure.

Referring to FIG. 13, the portable device 200 according to an embodiment of the disclosure may identify the extension section speed of the portable device 200 in operation 1310. Operation 1310 according to an embodiment of the disclosure may be performed, while the flexible display 203 is being extended according to an extension event (e.g., user input of a physical button) or before the extension event occurs. The extension section speed according to an embodiment of the disclosure may be set by the user or preset by the manufacturer of the portable device 200.

In operation 1320, the portable device 200 according to an embodiment of the disclosure may determine the pitch of sound to be output or content to be output based on the identified extension section speed. To this end, a lookup table defining the relationship between extension section speeds and pitches of the sound to be output or the relationship between extension section speeds and the content to be output may be stored in the portable device 200 (e.g., the memory 130 of FIG. 1) according to an embodiment of the disclosure. For example, as illustrated in FIG. 14, the pitch of the sound to be output through the portable device 200 may be higher in the extension section with the highest extension section speed (e.g., the first section 510) than in any other section. Similarly, the pitch of the sound to be output through the portable device 200 may be lower in the extension section with the lowest extension section speed (e.g., the second section 520) than in any other section.

In operation 1330, the portable device 200 according to an embodiment of the disclosure may output the sound based on the determined pitch or content. The portable device 200 according to an embodiment of the disclosure may output the sound, while extending the flexible display 203.

Figure 15:
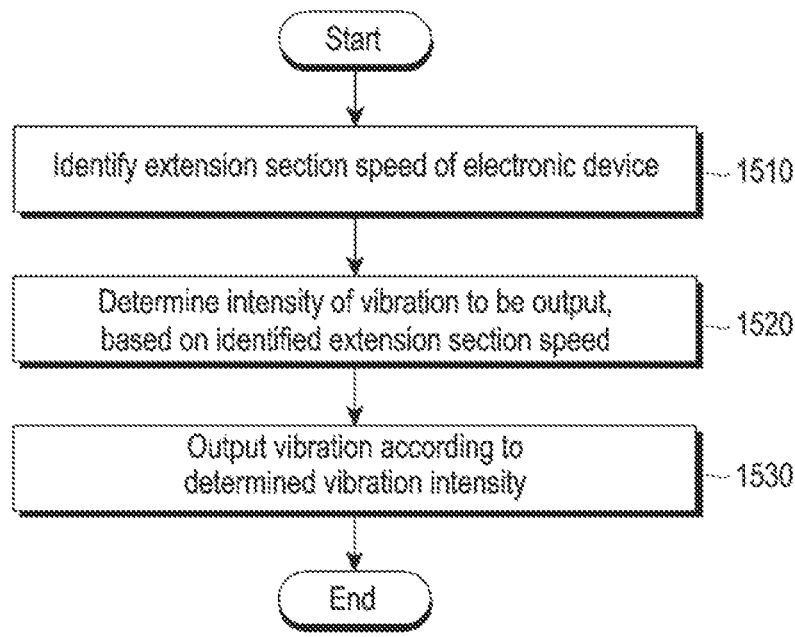
FIG. 15 is a flowchart illustrating a function or operation of determining a vibration intensity based on an extension section speed and outputting vibration with the determined intensity according to an embodiment of the disclosure.

FIG. 15 is a flowchart illustrating a function or operation of determining a vibration intensity based on an extension section speed and outputting vibration with the determined intensity according to an embodiment of the disclosure.

Referring to FIG. 15, the portable device 200 according to an embodiment of the disclosure may identify an extension section speed of the portable device 200 in operation 1510. Operation 1510 according to an embodiment of the disclosure may be performed, while the flexible display 203 is being extended according to an extension event (e.g., user input of a physical button) or before the extension event occurs. The extension section speed according to an embodiment of the disclosure may be set by the user or preset by the manufacturer of the portable device 200.

In operation 1520, the portable device 200 according to an embodiment of the disclosure may determine the intensity of vibration to be output based on the identified extension section speed. To this end, a lookup table defining the relationship between extension section speeds and intensities of the vibration to be output may be stored in the portable device 200 (e.g., the memory 130 of FIG. 1) according to an embodiment of the disclosure. For example, the intensity of the vibration to be output through the portable device 200 may be greater in the extension section with the highest extension section speed (e.g., the first section 510) than in any other section. Similarly, the intensity of the vibration to be output through the portable device 200 may be less in the extension section with the lowest extension section speed (e.g., the second section 520) than in any other section. In operation 1530, the portable device 200 according to an embodiment of the disclosure may output the vibration based on the determined vibration intensity.

Figure 16:
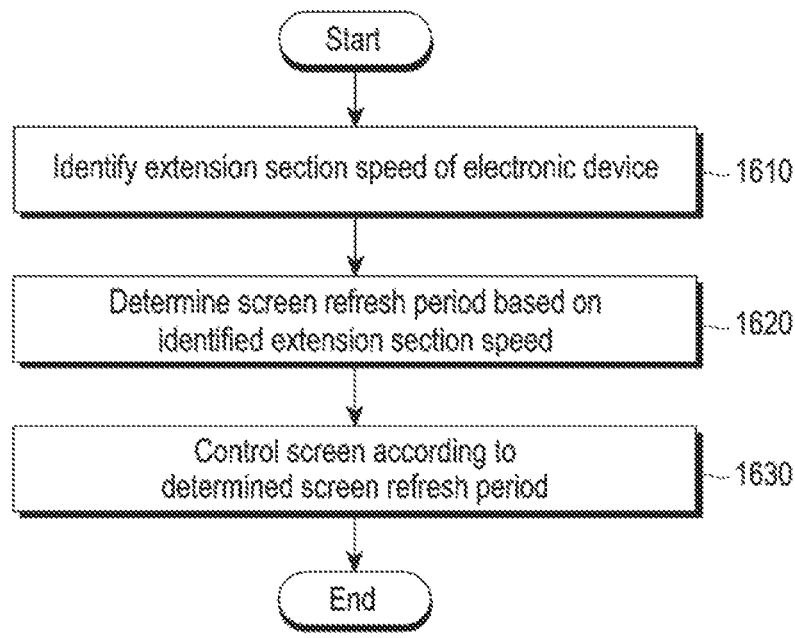
FIG. 16 is a flowchart illustrating a function or operation of determining a refresh period based on an extension section speed and controlling a screen based on the determined refresh period according to an embodiment of the disclosure.

FIG. 16 is a flowchart illustrating a function or operation of determining a refresh period based on an extension section speed and controlling a screen based on the determined refresh period according to an embodiment of the disclosure.

Referring to FIG. 16, the portable device 200 according to an embodiment of the disclosure may identify an extension section speed of the portable device 200 in operation 1610. Operation 1610 according to an embodiment of the disclosure may be performed, while the flexible display 203 is being extended according to an extension event (e.g., user input of a physical button) or before the extension event occurs. The extension section speed according to an embodiment of the disclosure may be set by the user or preset by the manufacturer of the portable device 200.

In operation 1620, the portable device 200 according to an embodiment of the disclosure may determine the screen refresh period based on the identified extension section speed. To this end, a lookup table defining the relationship between extension section speeds and screen refresh periods may be stored in the portable device 200 (e.g., the memory 130 of FIG. 1) according to an embodiment of the disclosure. For example, the screen refresh period may be shorter in the extension section with the highest extension section speed (e.g., the first section 510) than in any other section. Similarly, the screen refresh period may be longer in the extension section with the lowest extension section speed (e.g., the second section 520) than in any other section. In operation 1630, the portable device 200 according to an embodiment of the disclosure may control the screen based on the determined screen refresh period.

According to an embodiment of the disclosure, the extension speed of the flexible display 203 may be determined according to the type of the currently running application. For example, when the current image displayed on the portable device 200 has a relatively large variation between frames (e.g., when an action movie is currently playing), the processor 120 may set a high extension section speed. When the current image displayed on the portable device 200 has a relatively small variation between frames (e.g., when a static image is displayed), the processor 120 may set a low extension section speed.

Figure 17:
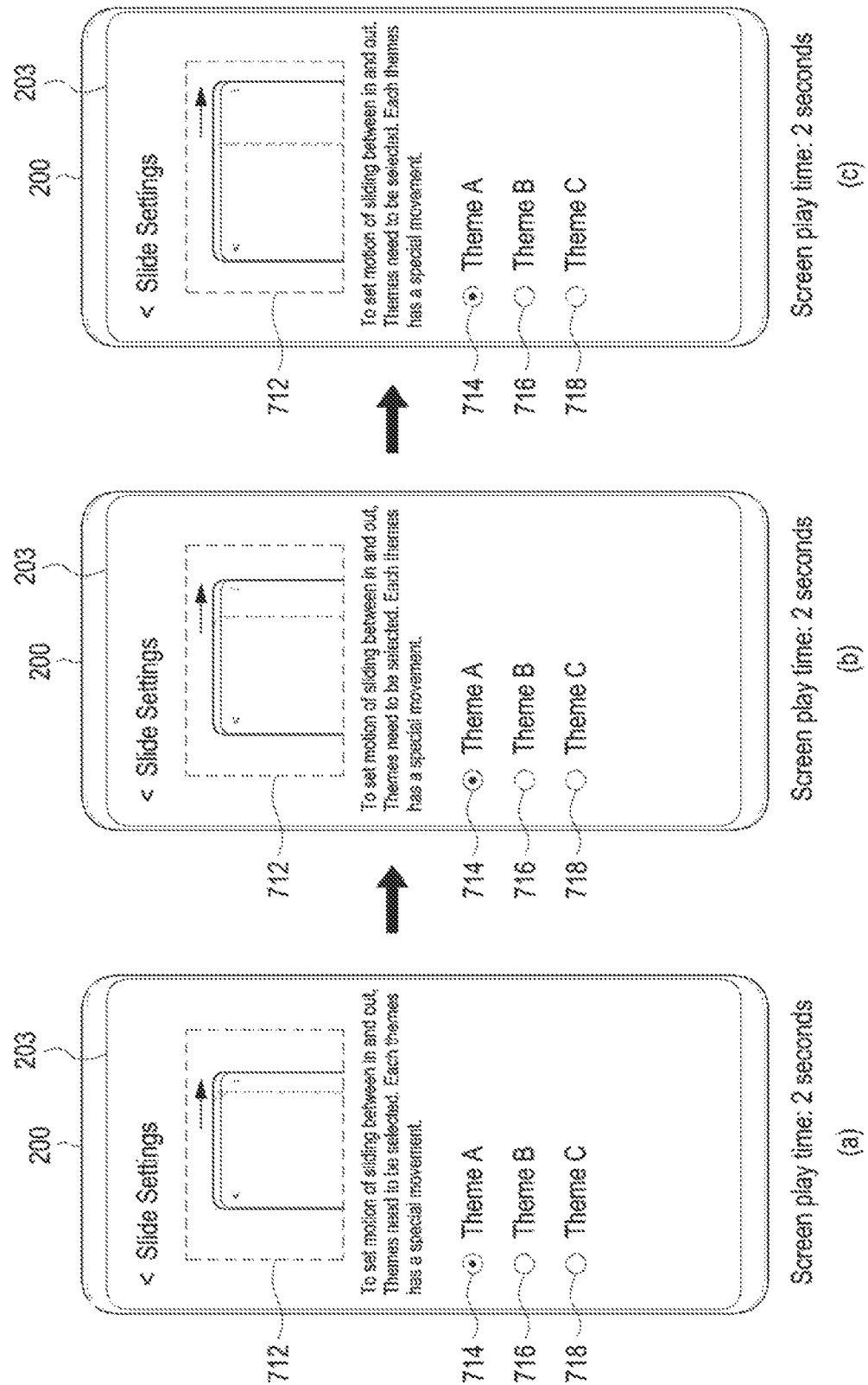
FIG. 17 is a diagram illustrating an exemplary preview screen according to an embodiment of the disclosure.

FIG. 17 is a diagram illustrating an example of the preview screen 712 according to an embodiment of the disclosure. In FIG. 17, the extension sections have the same lengths and the same extension section speeds according to an embodiment of the disclosure, by way of example. Referring to FIG. 17(a), the portable device 200 according to an embodiment of the disclosure may provide, as an example of the preview screen 712 according to an embodiment of the disclosure, an animation representing extension of the exposed area of the flexible display 203 by a first length from the full closed state of the portable device 200 (e.g., 3 cm from the closed state (e.g., 0 cm)) or an animation representing extension of the exposed area of the flexible display 203 at a first speed from the full closed state of the portable device 200. According to an embodiment of the disclosure, since the extension sections have the same lengths and the same extension section speeds, the preview screen 712 may be reproduced for the same duration (e.g., 2 seconds) in each section (e.g., the first section 510, the second section 520, and the third section 530) in FIG. 17. A preview screen play time according to an embodiment of the disclosure may be preset for each section or set by a user selection. The portable device 200 according to an embodiment of the disclosure has knowledge of the play time of the preview screen and the extension speed of the exposed area of the flexible display 203, and the portable device 200 may calculate the length (e.g., 3 cm) by which the exposed area is extended based on the information. The portable device 200 according to an embodiment of the disclosure may provide the preview screen 712 based on the calculation result. Referring to FIG. 17(b), the portable device 200 according to an embodiment of the disclosure may provide, as the preview screen 712, an animation representing extension of the exposed area of the flexible display 203 by a second length from the state in which the exposed area of the flexible display 203 is extended by the first length (e.g., 6 cm from the closed state (e.g., 0 cm)) or an animation representing extension of the exposed area of the flexible display 203 at a second speed from the state in which the exposed area of the flexible display 203 is being extended at the first speed. Referring to FIG. 17(c), the portable device 200 according to an embodiment of the disclosure may provide, as the preview screen 712, an animation representing extension of the exposed area of the flexible display 203 by a third length from the state in which the exposed area of the flexible display 203 is extended by the second length (e.g., 9 cm from the closed state (e.g., 0 cm)) or an animation representing extension of the exposed area of the flexible display 203 at a third speed from the state in which the exposed area of the flexible display 203 is being extended at the second speed. In FIG. 17, an image of the portable device 200 in the closed state (e.g., the length of the flexible display 230 in the closed state) is marked with a dotted line. The dotted line may or may not be drawn for the portable device 200. In FIG. 17, the extension section speed may be proportional to an arrow length in the preview screen 712. For example, the arrows shown in the examples of the preview screen 712 are substantially of the same length, which means the extension sections have the same extension section speed.

Figure 18:
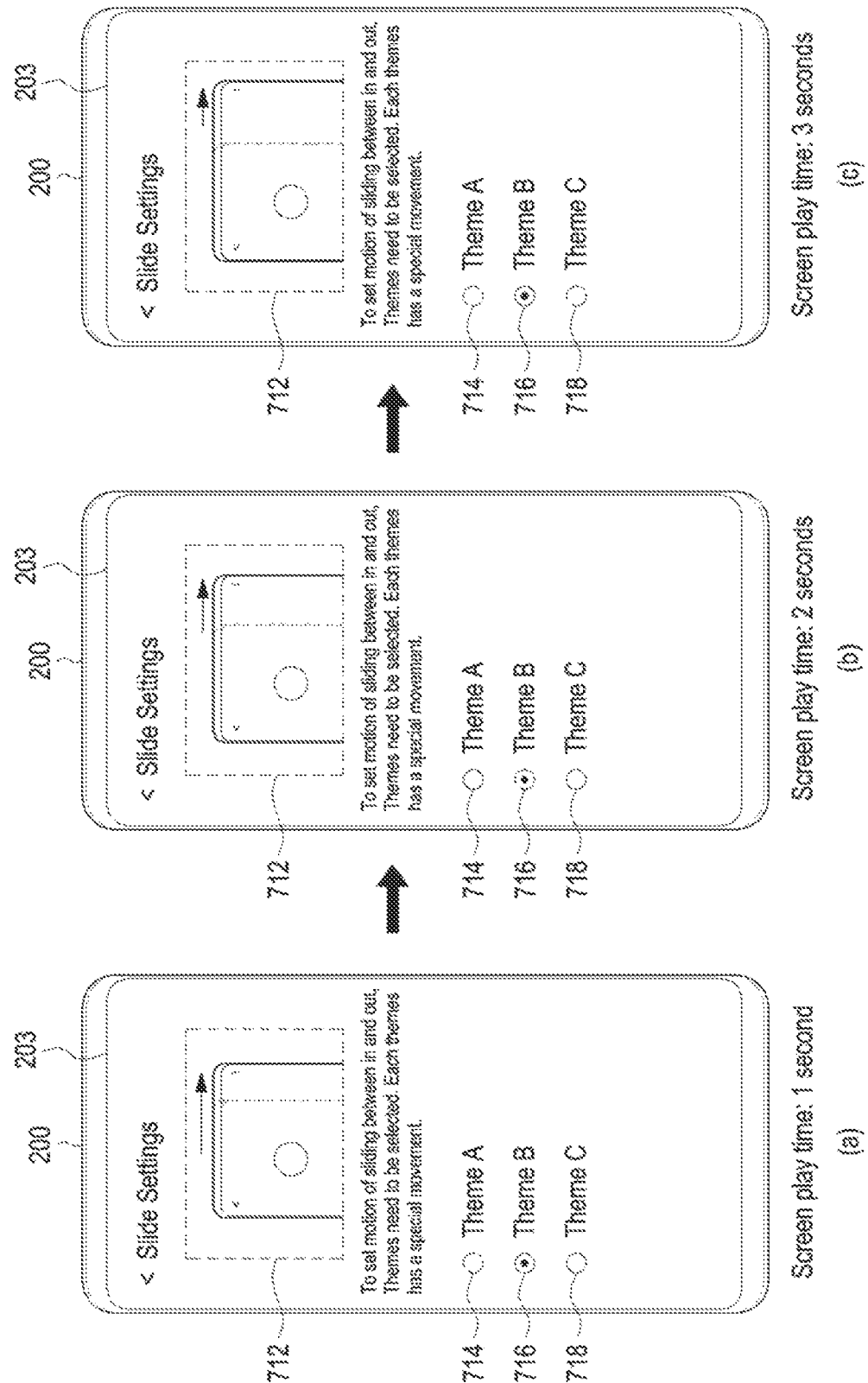
FIG. 18 is a diagram illustrating an exemplary preview screen according to another embodiment of the disclosure.

FIG. 18 is a diagram illustrating an exemplary preview screen according to another embodiment of the disclosure. In FIG. 18, the example of the preview screen 712 according to an embodiment of the disclosure is shown to indicate extension sections of the same extension section lengths but gradually decreasing extension section speeds (e.g., the flexible display 203 is initially extended at a high speed and then the speed is gradually decreased). According to an embodiment of the disclosure, because the same extension section lengths and different extension section speeds are set in FIG. 18, the preview screen 712 may be reproduced for different durations for each section (e.g., 1 second in the first section 510, 2 seconds in the second section 520, and 3 seconds in the third section 530).

Figure 19:
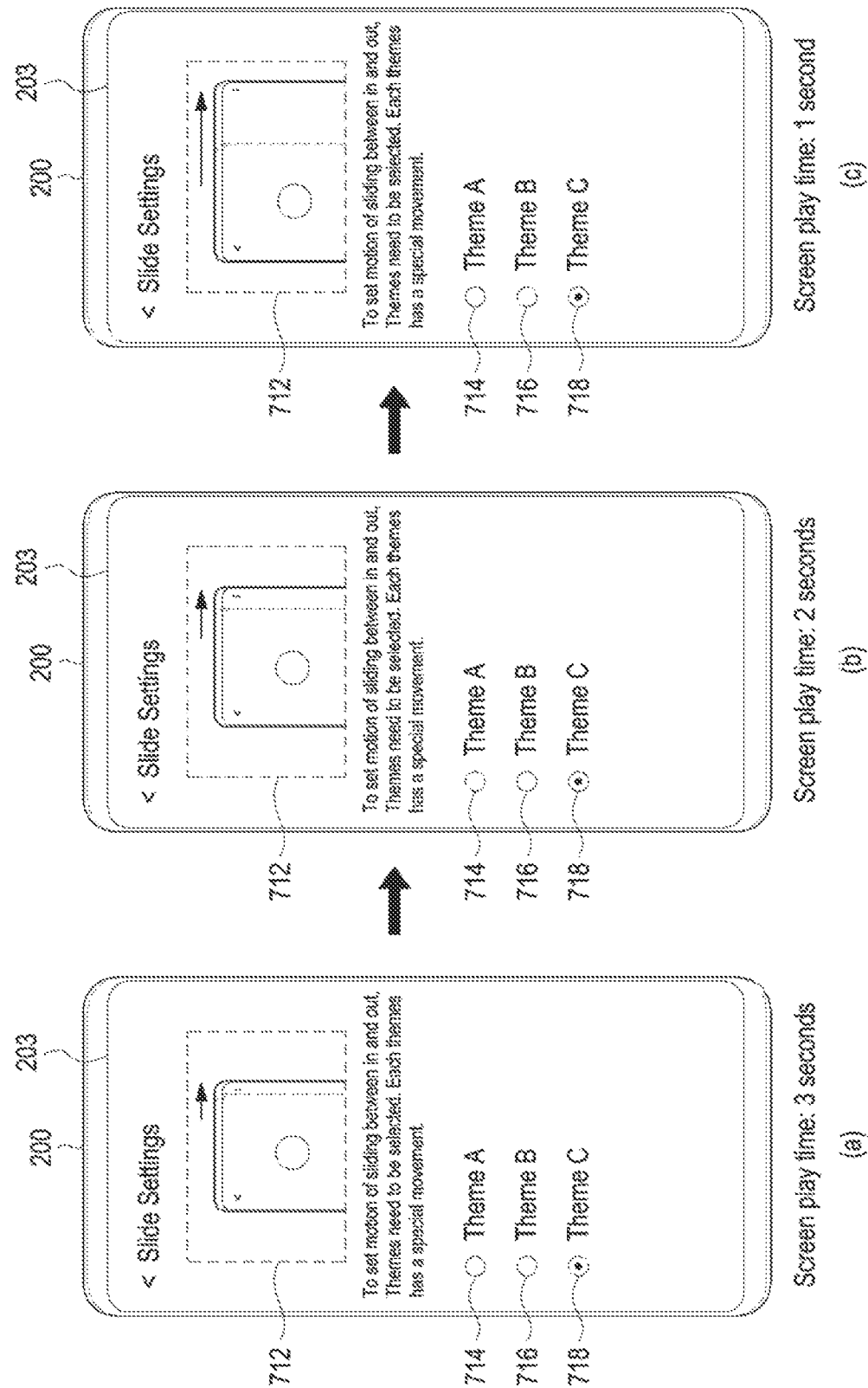
FIG. 19 is a diagram illustrating an exemplary preview screen according to another embodiment of the disclosure.

In FIGS. 17, 18, and 19, the extension section speed and the extension direction are represented as the length and direction of an arrow, respectively. For example, the arrow is longer in the preview screen 712 of FIG. 18(*a*) than in the preview screen 712 of FIG. 18(*c*), which implies that the speed of the first section 510 is higher than the speed of the third section 530.

Referring to FIG. 18(*a*), the portable device 200 according to an embodiment of the disclosure may provide, as the preview screen 712, an animation representing extension of the exposed area of the flexible display 203 by a fourth length from the full closed state of the portable device 200 (e.g., 6 cm from the closed state (e.g., 0 cm)) or an animation representing extension of the exposed area of the flexible display 203 at a fourth speed from the full closed state of the portable device 200. Referring to FIG. 18(*b*), the portable device 200 according to an embodiment of the disclosure may provide, as the preview screen 712, an animation representing extension of the exposed area of the flexible display 203 by a fifth length from the full closed state of the portable device 200 (e.g., 8 cm from the closed state (e.g., 0 cm)) or an animation representing extension of the exposed area of the flexible display 203 at a fifth speed from the state in which the exposed area of the flexible display 203 is being extended at the fourth speed. Referring to FIG. 18(*c*), the portable device 200 according to an embodiment of the disclosure may provide, as the preview screen 712, an animation representing extension of the exposed area of the flexible display 203 by a sixth length from the full closed state of the portable device 200 (e.g., 9 cm from the closed state (e.g., 0 cm)) or an animation representing extension of the exposed area of the flexible display 203 at a sixth speed from the state in which the exposed area of the flexible display 203 is being extended at the fifth speed. As in FIG. 17, the image of the portable device 200 in the closed state (e.g., the length of the flexible display 230 in the closed state) is marked with dotted line in FIG. 18. The dotted line may or may not be drawn for the portable device 200. In FIG. 18, the extension section speed is shown as proportional to an arrow length in the preview screen 712 in FIG. 18. For example, the arrows shown in the preview screen 712 have substantially different lengths. According to an embodiment of the disclosure, a long arrow (e.g., FIG. 18(*a*)) indicates a higher extension section speed relative to the extension section speeds of other sections. On the contrary, a short arrow (e.g., FIG. 18(*c*)) indicates a lower extension section speed relative to the extension section speeds of other sections. According to an embodiment of the disclosure, an arrow may or may not be displayed on the preview screen 712.

FIG. 19 is a diagram illustrating an exemplary preview screen according to another embodiment of the disclosure. In FIG. 19, the example of the preview screen 712 according to an embodiment of the disclosure is shown to indicate extension sections of the same extension section lengths but gradually increasing extension section speeds (e.g., the flexible display 203 is initially extended at a low speed and then the speed is gradually increased). According to an embodiment of the disclosure, because the same extension section lengths and different extension section speeds are set in FIG. 19, the preview screen 712 may be reproduced for different duration ins each section (e.g., 3 seconds in the first section 510, 2 seconds in the second section 520, and 1 second in the third section 530). Referring to FIG. 19(*a*), the portable device 200 according to an embodiment of the disclosure may provide, as the preview screen 712, an animation representing extension of the exposed area of the flexible display 203 by a seventh length from the full closed state of the portable device 200 (e.g., 1 cm from the closed state (e.g., 0 cm)) or an animation representing extension of the exposed area of the flexible display 203 at a seventh speed from the full closed state of the portable device 200. Referring to FIG. 19(*b*), the portable device 200 according to an embodiment of the disclosure may provide, as the preview screen 712, an animation representing extension of the exposed area of the flexible display 203 by an eighth length from the full closed state of the portable device 200 (e.g., 3 cm from the closed state (e.g., 0 cm)) or an animation representing extension of the exposed area of the flexible display 203 at an eighth speed from the state in which the exposed area of the flexible display 203 is being extended at the seventh speed. Referring to FIG. 19(*c*), the portable device 200 according to an embodiment of the disclosure may provide, as the preview screen 712, an animation representing extension of the exposed area of the flexible display 203 by a ninth length from the full closed state of the portable device 200 (e.g., 9 cm from the closed state (e.g., 0 cm)) or an animation representing extension of the exposed area of the flexible display 203 at a ninth speed from the state in which the exposed area of the flexible display 203 is being extended at the eighth speed. As in FIG. 17, the image of the portable device 200 in the closed state (e.g., the length of the flexible display 230 in the closed state) is marked with dotted line in FIG. 19. The dotted line may or may not be drawn for the portable device 200. In FIG. 19, the extension section speed is shown as proportional to an arrow length in the preview screen 712. For example, the arrows shown in the preview screen 712 have substantially different lengths in FIG. 19. According to an embodiment of the disclosure, a long arrow (e.g., FIG. 19(*c*)) indicates a higher extension section speed relative to the extension section speeds of other sections. On the contrary, a short arrow (e.g., FIG. 19(*a*)) indicates a lower extension section speed relative to the extension section speeds of the extension section speeds of other sections.

Figure 20:
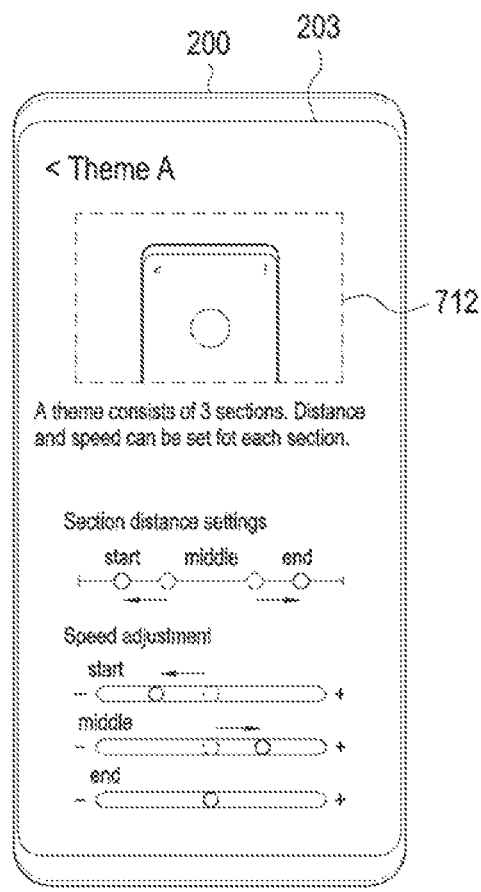
FIGS. 20 and 21 are exemplary diagrams illustrating a function or operation of reproducing a preview screen when an extension section length and an extension section speed are set according to an embodiment of the disclosure.
Figure 21:
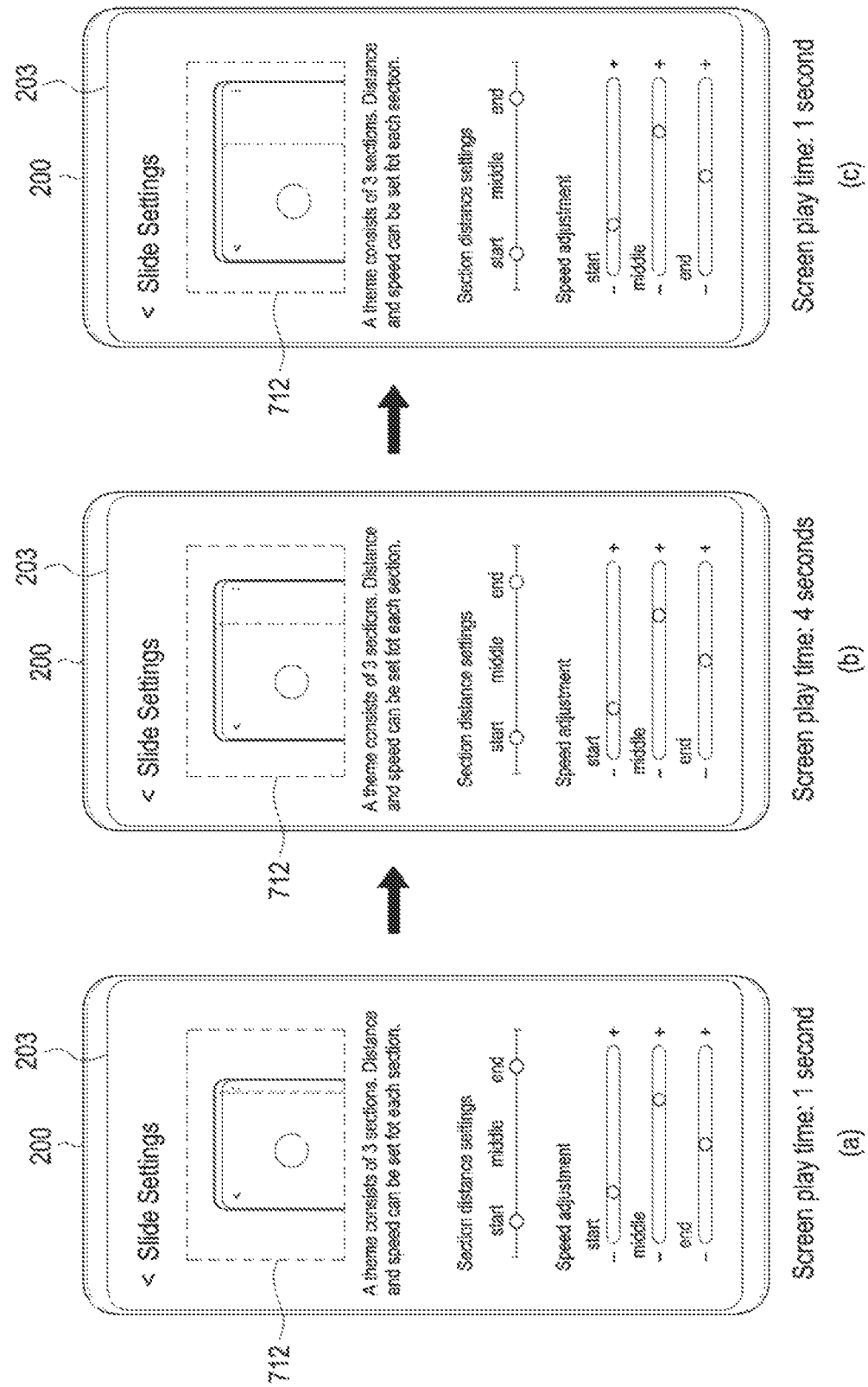

FIGS. 20 and 21 are exemplary diagrams illustrating a function or operation of reproducing a preview screen when an extension section length and an extension section speed are set according to an embodiment of the disclosure. Referring to FIG. 20, the portable device 200 according to an embodiment of the disclosure may receive a user input for changing an extension section length and/or an extension section speed. Referring to FIG. 21, the portable device 200 according to an embodiment of the disclosure may provide the preview screen 712 in response to the reception of the user input for changing the extension section length and/or the extension section speed. In the embodiment described in FIG. 21, different extensions section lengths are set, and thus the preview screen 712 may be reproduced at different durations in each section (e.g., the first section 510, the second section 520, and the third section 530). For example, as the second section 520 is set to be longest, the play time of the preview screen 712 corresponding to the second section 520 may be longest. Referring to FIG. 21(a), the portable device 200 according to an embodiment of the disclosure may provide, as the preview screen 712, an animation representing extension of the exposed area of the flexible display 203 by a tenth length from the full closed state of the portable device 200 (e.g., 1 cm from the closed state (e.g., 0 cm)) or an animation representing extension of the exposed area of the flexible display 203 at a tenth speed from the full closed state of the portable device 200. Referring to FIG. 21(b), the portable device 200 according to an embodiment of the disclosure may provide, as the preview screen 712, an animation representing extension of the exposed area of the flexible display 203 by an eleventh length from the state in which the portable device 200 is extended by the tenth length (e.g., 8 cm from the closed state (e.g., 0 cm)) or an animation representing extension of the exposed area of the flexible display 203 at an eleventh speed from the state in which the exposed area of the flexible display 203 is being extended at the tenth speed. Referring to FIG. 21(c), the portable device 200 according to an embodiment of the disclosure may provide, as the preview screen 712, an animation representing extension of the exposed area of the flexible display 203 by a twelfth length from the state in which the portable device 200 is extended by the eleventh length (e.g., 9 cm from the closed state (e.g., 0 cm)) or an animation representing extension of the exposed area of the flexible display 203 at a twelfth speed from the state in which the exposed area of the flexible display 203 is being extended at the eleventh speed. In FIG. 21, the image of the portable device 200 in the closed state (e.g., the length of the flexible display 230 in the closed state) is also marked with dotted line. The dotted line may or may not be drawn for the portable device 200.

An electronic device (e.g., the portable device 200) according to an embodiment of the disclosure may include a housing (e.g., the first housing 201 and the second housing), a flexible display (e.g., the flexible display 203) at least partially disposed inside the housing, at least one driving motor (e.g., a motor module) disposed inside the housing and configured to extend a part of the flexible display from the housing, a memory (e.g., the memory 130) storing at least one display extension profile related to control of the driving motor, and at least one processor (e.g., the processor 120). The at least one processor may be configured to identify occurrence of an event related to display of a preview screen showing a process of drawing out the flexible display, and display the preview screen showing the process of drawing out the flexible display through the flexible display, based on the at least one display extension profile stored in the memory in response to the identification of the occurrence of the event.

An electronic device (e.g., the portable device 200) according to an embodiment of the disclosure may include a housing (e.g., the first housing 201 and the second housing), a flexible display (e.g., the flexible display 203) at least partially disposed inside the housing, at least one driving motor (e.g., a motor module) disposed inside the housing and configured to extend a part of the flexible display from the housing, and at least one processor (e.g., the processor 120). The at least one processor may be configured to display a user interface screen for setting a length of at least one extension section of the flexible display and at least one extension section speed corresponding to the at least one extension section, on the flexible display, receive at least one first value for setting the length of the at least one extension section and at least one second value for setting the at least one extension section speed from a user through the flexible display, and display a preview screen showing a process of extending the flexible display based the at least one first value and the at least one second value on the user interface screen.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a housing, a flexible display at least partially disposed inside the housing, at least one driving motor disposed inside the housing and configured to draw out or extend a part of the flexible display from the housing, a memory storing a plurality of profiles having different speed set for each profile and a plurality of corresponding previews related to control of the at least one driving motor, and at least one processor, wherein the at least one processor is configured to:
provide, on the flexible display, a plurality of selectable menu items, wherein each of the plurality of selectable menu items corresponds to each of the plurality of profiles;
receive a user input for selecting menu item among the plurality of selectable menu items;
identify a preview corresponding to the selected menu item, the occurrence of an event related to display of a preview showing a process of drawing out or extending the flexible display; and
display the identified preview the flexible display through the flexible display, based on a corresponding profile stored in the memory,
wherein the identified preview includes a moving image showing the process of drawing out or extending the flexible display with the speed set according to the corresponding profile.

2. The electronic device of claim 1, wherein the one or more selectable menu items include a theme selection, a length setting of an extension section of the flexible display, and a speed setting of an extension section of the flexible display.

3. The electronic device of claim 2, wherein the length and the speed are set by data input.

4. The electronic device of claim 1, wherein the at least one preview is displayed on a video screen.

5. The electronic device of claim 2, further comprising at least one speaker, wherein the at least one processor is further configured to output sound corresponding to the speed of the extension section through the at least one speaker, along with display of the identified at least one preview.

6. The electronic device of claim 2, wherein the at least one processor is further configured, when the flexible display is extended, to provide a bouncing effect based on a last speed of the extension section.

7. The electronic device of claim 5, wherein the at least one processor is further configured to, when the flexible display is extended:
control a volume and/or play speed of the sound to be output based on the speed of the extension section; and
output the sound.

8. The electronic device of claim 5, wherein the at least one processor is further configured to, when the flexible display is extended:
control a pitch of the sound to be output based on the speed of the extension section; and
output the sound.

9. The electronic device of claim 5, wherein the at least one processor is further configured to, when the flexible display is extended:
- determine content to be output based on the speed of the extension section; and
- output the determined content.

10. A method of controlling an electronic device, the method comprising:
- providing a housing, a flexible display at least partially disposed inside the housing, at least one driving motor disposed inside the housing and configured to draw out or extend a part of the flexible display from the housing, a memory storing at least one profile having different speed set for each profile and corresponding at least one preview related to control of the at least one driving motor, and at least one processor;
- providing, on the flexible display, images associated with one or more selectable menu items, wherein each of the one or more selectable menu items corresponds to the at least one profile;
- receiving a selection of the one or more selectable menu items;
- identifying the at least one preview corresponding to the received selection, the at least one preview showing a process of drawing out or extending a flexible display of the electronic device; and
- displaying the identified at least one preview showing the process of drawing out or extending the flexible display based on corresponding at least one profile stored in the memory of the electronic device,
- wherein the identified preview includes a moving image showing the process of drawing out or extending the flexible display with the speed set according to the corresponding profile.

11. The method of claim 10, wherein the one or more selectable menu items includes at least one of a theme selection, a length setting of an extension section of the flexible display, and a speed setting of an extension section of the flexible display.

12. The method of claim 11, wherein the length and the speed are set by data input.

13. The method of claim 10, wherein the at least one preview is displayed on a video screen.

14. The method of claim 11, wherein the electronic device further includes at least one speaker, and wherein the method further comprises: outputting sound corresponding to the speed of the extension section through the at least one speaker, along with display of the identified at least one preview.

15. The method of claim 11, further comprising, when the flexible display is extended, providing a bouncing effect based on a last speed of the extension section.

16. The method of claim 14, further comprising:
- when the flexible display is extended, controlling a volume and/or play speed of the sound to be output based on the speed of the extension section; and
- outputting the sound.

17. The method of claim 14, further comprising:
- when the flexible display is extended, determining a screen refresh period based on the speed of the extension section; and
- outputting content on the flexible display based on the screen refresh period.

18. An electronic device comprising:
- a first housing;
- a second housing movably disposed with respect to the first housing;
- at least one processor;
- a driving motor disposed inside the first housing;
- a flexible display inserted into or drawn out from inside of the first housing according to a movement of the second housing, and
- a memory for storing information on at least one theme to be displayed on the flexible display; and
- wherein the at least one processor is configured to; set, with respect to the theme, at least one extension section speed corresponding to at least one extension section of the flexible display,
- wherein the identified preview includes a moving image showing the process of drawing out or extending the flexible display with the speed set according to the corresponding profile.

19. The electronic device of claim 18, wherein the at least one processor is further configured, when the flexible display is extended, to provide a bouncing effect based on speed of a last extension section of the flexible display.

20. The electronic device of claim 18, wherein the at least one processor is further configured, when the flexible display is extended, to control a volume and/or a play speed of the sound to be output based on speed of the extension section of the flexible display; and output the sound.

* * * * *